US011601893B2

(12) United States Patent
Bai et al.

(10) Patent No.: US 11,601,893 B2
(45) Date of Patent: Mar. 7, 2023

(54) SIDELINK COORDINATION FOR POWER CONTROL

(71) Applicant: QUALCOMM Incorporated, San Diego, CA (US)

(72) Inventors: Tianyang Bai, Bridgewater, NJ (US); Kapil Gulati, Hillsborough, NJ (US); Jung Ho Ryu, Fort Lee, NJ (US); Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/985,872

(22) Filed: Aug. 5, 2020

(65) Prior Publication Data

US 2021/0051602 A1 Feb. 18, 2021

Related U.S. Application Data

(60) Provisional application No. 62/887,522, filed on Aug. 15, 2019.

(51) Int. Cl.
*H04W 52/24* (2009.01)
*H04W 52/14* (2009.01)
*H04W 92/18* (2009.01)

(52) U.S. Cl.
CPC ....... *H04W 52/248* (2013.01); *H04W 52/143* (2013.01); *H04W 52/241* (2013.01); *H04W 52/242* (2013.01); *H04W 92/18* (2013.01)

(58) Field of Classification Search
None
See application file for complete search history.

(56) References Cited

U.S. PATENT DOCUMENTS

2016/0037530 A1 2/2016 Peng et al.
2016/0227518 A1 8/2016 Li et al.
(Continued)

FOREIGN PATENT DOCUMENTS

WO WO-2018105158 A1 6/2018

OTHER PUBLICATIONS

International Search Report and Written Opinion—PCT/US2020/045130—ISA/EPO—dated Oct. 22, 2020.
(Continued)

*Primary Examiner* — German Viana Di Prisco
(74) *Attorney, Agent, or Firm* — Holland & Hart LLP/Qualcomm Incorporated

(57) ABSTRACT

Methods, systems, and devices for wireless communications are described. In some cases, a first user equipment (UE) within a coverage area of a base station may determine a power control configuration. The first UE may transmit an indication of the power control configuration to a second UE, which may adjust one or more power control parameters based on the indication. The one or more power control parameters may include a target received power, a compensation factor, a downlink path loss between the base station and the first UE, or a combination thereof. The second UE may use the adjusted one or more power control parameters to determine a transmit power and may transmit a message to the first UE with the determined transmit power. In some cases, the second UE may be outside of the coverage area of the base station.

30 Claims, 20 Drawing Sheets

(56) References Cited

U.S. PATENT DOCUMENTS

| | | |
|---|---|---|
| 2016/0330729 A1* | 11/2016 | Wei ..................... H04W 52/244 |
| 2016/0381523 A1* | 12/2016 | Baghel ................. H04W 76/14 |
| | | 370/315 |
| 2017/0135048 A1 | 5/2017 | Cao |
| 2018/0343626 A1* | 11/2018 | Li ....................... H04W 52/325 |
| 2019/0174429 A1 | 6/2019 | Wang et al. |
| 2020/0008127 A1 | 1/2020 | Ohtsuji |
| 2020/0260386 A1* | 8/2020 | Ryu ................... H04W 52/383 |
| 2022/0078721 A1* | 3/2022 | Xue ................... H04W 52/242 |

OTHER PUBLICATIONS

"3rd Generation Partnership Project, Technical Specification Group Radio Access Network, NR, Physical Layer Procedures for Control (Release 16)", 3GPP TS 38.213 version 16.2.0 Release 16, ETSI TS 138.213 V16.2.0 (Jul. 2020), pp. 160-166.

* cited by examiner

SIDELINK COORDINATION FOR POWER CONTROL

CROSS REFERENCE

The present application for patent claims the benefit of U.S. Provisional Patent Application No. 62/887,522 by BAI et al., entitled "SIDELINK COORDINATION FOR POWER CONTROL," filed Aug. 15, 2019, assigned to the assignee hereof, and expressly incorporated by reference herein.

INTRODUCTION

The following relates to wireless communications, and more specifically to coordination for power control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method for wireless communication at a first UE is described. The method may include determining a power control configuration corresponding to communication between the first UE and a base station, where the first UE is within a coverage area of the base station. The method may additionally include transmitting an indication of the power control configuration to a second UE, where the second UE uses the power control configuration to adjust one or more power control parameters.

An apparatus for wireless communication at a first UE is described. The apparatus may include a processor and memory coupled to the processor. The processor and memory may be configured to determine a power control configuration corresponding to communication between the first UE and a base station, where the first UE is within a coverage area of the base station. The processor and memory may be further configured to transmit an indication of the power control configuration to a second UE, where the second UE uses the power control configuration to adjust one or more power control parameters.

Another apparatus for wireless communication at a first UE is described. The apparatus may include means for determining a power control configuration corresponding to communication between the first UE and a base station, where the first UE is within a coverage area of the base station. The apparatus may further include means for transmitting an indication of the power control configuration to a second UE, where the second UE uses the power control configuration to adjust one or more power control parameters.

A non-transitory computer-readable medium storing code for wireless communication at a first UE is described. The code may include instructions executable by a processor to determine a power control configuration corresponding to communication between the first UE and a base station, where the first UE is within a coverage area of the base station. The instructions may be further executable by the processor to transmit an indication of the power control configuration to a second UE, where the second UE uses the power control configuration to adjust one or more power control parameters.

Some examples of the method, apparatuses, and non-transitory computer-readable medium described herein may further include operations, features, means, or instructions for receiving, from the second UE, a message based on the indication of the power control configuration.

Some examples of the method, apparatuses, and non-transitory computer-readable medium described herein may further include operations, features, means, or instructions for determining a path loss associated with the communication between the first UE and the base station, where the power control configuration includes an indication of the path loss.

In some examples of the method, apparatuses, and non-transitory computer-readable medium described herein, the power control configuration includes an indication of a target received power, an indication of a compensation factor, or a combination thereof.

Some examples of the method, apparatuses, and non-transitory computer-readable medium described herein may further include operations, features, means, or instructions for receiving, from the second UE, a request for the indication of the power control configuration, and transmitting, to the second UE, the indication of the power control configuration based on the request.

Some examples of the method, apparatuses, and non-transitory computer-readable medium described herein may further include operations, features, means, or instructions for receiving, from the base station, a command for transmitting the indication of the power control configuration, and transmitting, to the second UE, the indication of the power control configuration based on the command.

Some examples of the method, apparatuses, and non-transitory computer-readable medium described herein may further include operations, features, means, or instructions for transmitting the power control configuration to a third UE.

In some examples of the method, apparatuses, and non-transitory computer-readable medium described herein, the second UE may be outside of the coverage area of the base station.

Some examples of the method, apparatuses, and non-transitory computer-readable medium described herein may further include operations, features, means, or instructions for determining a group of UEs including the second UE and transmitting, to the base station, a message from the first UE determining the group of UEs and indicating that the second UE is outside of the coverage area of the base station.

A method for wireless communication at a first UE is described. The method may include receiving, from a second UE, an indication of a power control configuration corresponding to communication between the second UE and a base station, the second UE being within a coverage area of the base station. The method may further include adjusting one or more power control parameters of the first UE based on the indication of the power control configuration. The method may further include transmitting, to the second UE, a message based on adjusting the one or more power control parameters.

An apparatus for wireless communication at a first UE is described. The apparatus may include a processor and memory coupled to the processor. The processor and memory may be configured to receive, from a second UE, an indication of a power control configuration corresponding to communication between the second UE and a base station, the second UE being within a coverage area of the base station. The processor and memory may be further configured to adjust one or more power control parameters of the first UE based on the indication of the power control configuration. The processor and memory may be further configured to transmit, to the second UE, a message based on adjusting the one or more power control parameters.

Another apparatus for wireless communication at a first UE is described. The apparatus may include means for receiving, from a second UE, an indication of a power control configuration corresponding to communication between the second UE and a base station, the second UE being within a coverage area of the base station. The apparatus may further include means for adjusting one or more power control parameters of the first UE based on the indication of the power control configuration. The apparatus may further include means for transmitting, to the second UE, a message based on adjusting the one or more power control parameters.

A non-transitory computer-readable medium storing code for wireless communication at a first UE is described. The code may include instructions executable by a processor to receive, from a second UE, an indication of a power control configuration corresponding to communication between the second UE and a base station, the second UE being within a coverage area of the base station. The instructions may be further executable by the processor to adjust one or more power control parameters of the first UE based on the indication of the power control configuration. The instructions may be further executable by the processor to transmit, to the second UE, a message based on adjusting the one or more power control parameters.

In some examples of the method, apparatuses, and non-transitory computer-readable medium described herein, the indication of the power control configuration may include operations, features, means, or instructions for adjusting the one or more power control parameters of the first UE based on the indication of the path loss, and transmitting the message to the second UE based on the indication of the path loss.

In some examples of the method, apparatuses, and non-transitory computer-readable medium described herein, the indication of the power control configuration may include operations, features, means, or instructions for adjusting the one or more power control parameters of the first UE based on the indication of the target received power, the indication of the compensation factor, or the combination thereof, and transmitting the message to the second UE based on the indication of the target received power, the indication of the compensation factor, or the combination thereof.

Some examples of the method, apparatuses, and non-transitory computer-readable medium described herein may further include operations, features, means, or instructions for determining that one or more sidelink proximity parameters associated with communication between the first UE and the second UE satisfy one or more corresponding thresholds, and adjusting the one or more power control parameters based on the one or more sidelink proximity parameters satisfying the one or more corresponding thresholds.

Some examples of the method, apparatuses, and non-transitory computer-readable medium described herein may further include operations, features, means, or instructions for determining that the path loss may be below a threshold path loss, and adjusting the one or more power control parameters based on the path loss being below the threshold path loss.

Some examples of the method, apparatuses, and non-transitory computer-readable medium described herein may further include operations, features, means, or instructions for determining that the distance may be below a threshold distance, and adjusting the one or more power control parameters based on the distance being below the threshold distance.

Some examples of the method, apparatuses, and non-transitory computer-readable medium described herein may further include operations, features, means, or instructions for determining that the reference signal received power (RSRP) may be above an RSRP threshold, and adjusting the one or more power control parameters based on the RSRP being above the RSRP threshold.

Some examples of the method, apparatuses, and non-transitory computer-readable medium described herein may further include operations, features, means, or instructions for transmitting, to the second UE, a request for the indication of the power control configuration, and receiving the indication of the power control configuration based on transmitting the request.

Some examples of the method, apparatuses, and non-transitory computer-readable medium described herein may further include operations, features, means, or instructions for determining a transmit power based on the adjusted one or more power control parameters, and transmitting the message to the second UE based on the determined transmit power.

Some examples of the method, apparatuses, and non-transitory computer-readable medium described herein may further include operations, features, means, or instructions for determining a path loss associated with communication between the first UE and the second UE, and determining the transmit power based on the path loss.

In some examples of the method, apparatuses, and non-transitory computer-readable medium described herein, the indication of the power control configuration includes an indication of a target received power, an indication of a compensation factor, or a combination thereof, where the transmit power may be linearly proportional to the indicated target received power, exponentially proportional to the indicated compensation factor, or a combination thereof.

In some examples of the method, apparatuses, and non-transitory computer-readable medium described herein, the first UE may be outside of the coverage area of the base station.

A method for wireless communication at a base station is described. The method may include transmitting, to a first UE, a command for transmitting, from the first UE and to a second UE, an indication of a power control configuration corresponding to communication between the first UE and the base station, where the first UE is within a coverage area of the base station, and where the second UE uses the power control configuration to adjust one or more power control parameters.

An apparatus for wireless communication at a base station is described. The apparatus may include a processor and memory coupled to the processor. The processor and memory may be configured to transmit, to a first UE, a command for transmitting, from the first UE and to a second UE, an indication of a power control configuration corresponding to communication between the first UE and the base station, where the first UE is within a coverage area of the base station, and where the second UE uses the power control configuration to adjust one or more power control parameters.

Another apparatus for wireless communication at a base station is described. The apparatus may include means for transmitting, to a first UE, a command for transmitting, from the first UE and to a second UE, an indication of a power control configuration corresponding to communication between the first UE and the base station, where the first UE is within a coverage area of the base station, and where the second UE uses the power control configuration to adjust one or more power control parameters.

A non-transitory computer-readable medium storing code for wireless communication at a base station is described. The code may include instructions executable by a processor to transmit, to a first UE, a command for transmitting, from the first UE and to a second UE, an indication of a power control configuration corresponding to communication between the first UE and the base station, where the first UE is within a coverage area of the base station, and where the second UE uses the power control configuration to adjust one or more power control parameters.

A method for wireless communication at a base station is described. The method may include receiving a message from a first UE identifying a group of UEs. The method may further include determining at least a second UE of the group of UEs is out of coverage of the base station based on the message. The method may further include transmitting, to the first UE, a command for transmitting, from the first UE and to the second UE, an indication of a power control configuration corresponding to communication between the first UE and the base station, where the first UE is within a coverage area of the base station, and where the second UE uses the power control configuration to adjust one or more power control parameters.

An apparatus for wireless communication at a base station is described. The apparatus may include a processor and memory coupled to the processor. The processor and memory may be configured to receive a message from a first UE identifying a group of UEs. The processor and memory may be further configured to determine at least a second UE of the group of UEs is out of coverage of the base station based on the message. The processor and memory may be further configured to transmit, to the first UE, a command for transmitting, from the first UE and to the second UE, an indication of a power control configuration corresponding to communication between the first UE and the base station, where the first UE is within a coverage area of the base station, and where the second UE uses the power control configuration to adjust one or more power control parameters.

Another apparatus for wireless communication at a base station is described. The apparatus may include means for receiving a message from a first UE identifying a group of UEs. The apparatus may further include means for determining at least a second UE of the group of UEs is out of coverage of the base station based on the message. The apparatus may further include means for transmitting, to the first UE, a command for transmitting, from the first UE and to the second UE, an indication of a power control configuration corresponding to communication between the first UE and the base station, where the first UE is within a coverage area of the base station, and where the second UE uses the power control configuration to adjust one or more power control parameters.

A non-transitory computer-readable medium storing code for wireless communication at a base station is described. The code may include instructions executable by a processor to receive a message from a first UE identifying a group of UEs. The instructions may be further executable by the processor to determine at least a second UE of the group of UEs is out of coverage of the base station based on the message. The instructions may be further executable by the processor to transmit, to the first UE, a command for transmitting, from the first UE and to the second UE, an indication of a power control configuration corresponding to communication between the first UE and the base station, where the first UE is within a coverage area of the base station, and where the second UE uses the power control configuration to adjust one or more power control parameters.

Some examples of the method, apparatuses, and non-transitory computer-readable medium described herein may further include operations, features, means, or instructions for receiving a transmission from the first UE based on the second UE using the power control configuration to adjust the one or more power control parameters.

In some examples of the method, apparatuses, and non-transitory computer-readable medium described herein, the power control configuration includes an indication of a target received power, an indication of a compensation factor, or a combination thereof, and where the transmission may be received based on the power control configuration including the indication of the target received power, the indication of the compensation factor, or the combination thereof.

In some examples of the method, apparatuses, and non-transitory computer-readable medium described herein, the power control configuration includes an indication of a path loss corresponding to communication between the base station and the first UE.

In some examples of the method, apparatuses, and non-transitory computer-readable medium described herein, the second UE may be outside of the coverage area of the base station.

DETAILED DESCRIPTION

Figure 1:
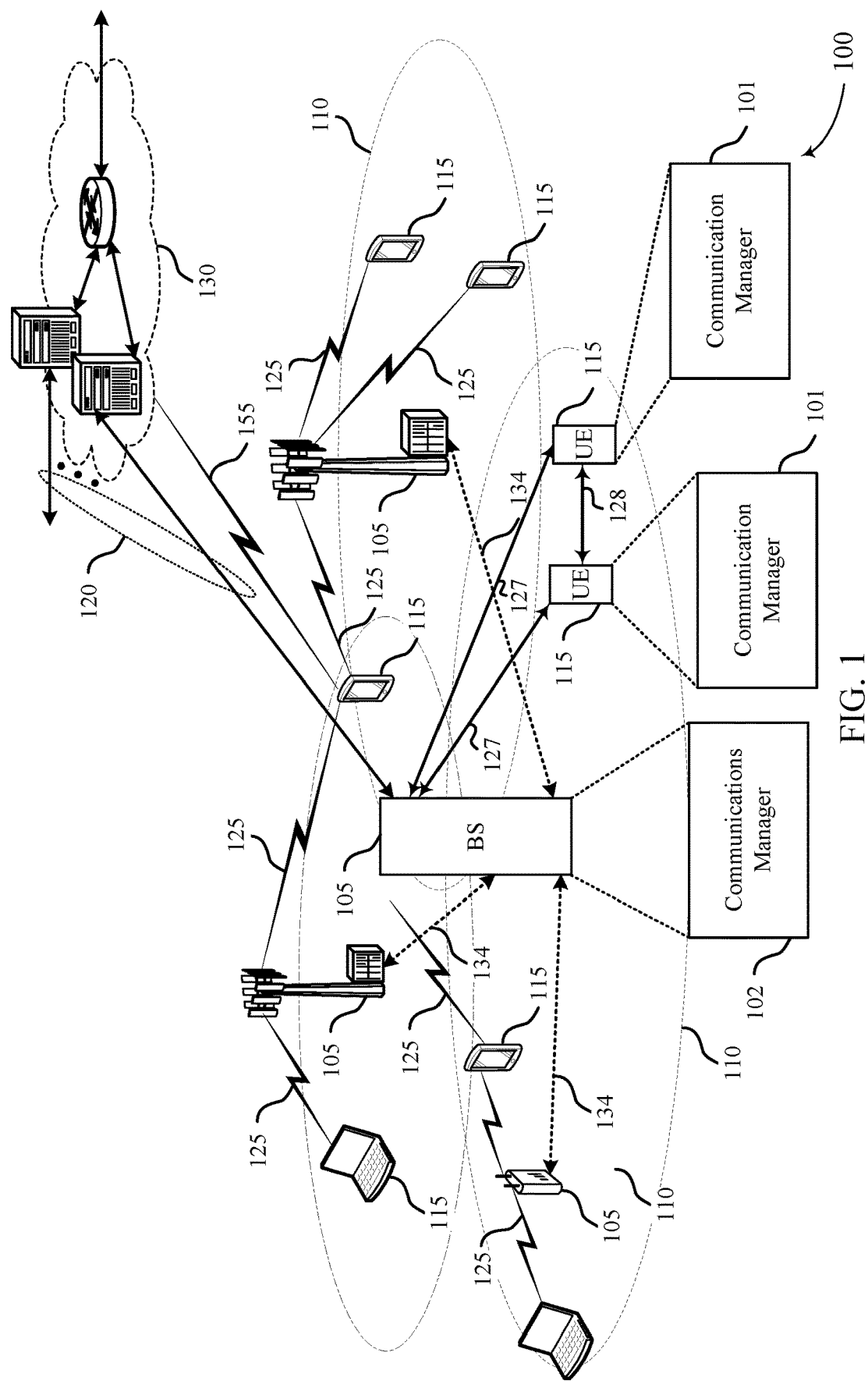
FIG. 1 illustrates an example of a wireless communications system that supports sidelink coordination for power control in accordance with one or more aspects of the present disclosure.

In some cases, a first UE may transmit a message via a sidelink to a second UE, where the second UE is located inside a coverage area of a base station. If a transmit power of the message is above a first threshold level, the message may interfere with an access link between the second UE and the base station and may affect communications along the access link. If the transmit power is below a second threshold level, however, the second UE may fail to receive and successfully decode the message. By performing power control, the first UE may transmit the message with a sufficient transmit power such that the message is received and successfully decoded by the second UE while mitigating interference along the access link.

Performing power control for sidelink transmissions may involve determining a transmit power. The first UE may determine the transmit power based on power control parameters, such as a downlink path loss between the first UE and the base station, a target received power, a compensation factor, or a combination thereof. However, in some cases, the first UE may be unable to determine values for these power control parameters or may determine values that do not explicitly correspond to the access link between the second UE and the base station. For instance, in one example, the first UE may be in a coverage area of another base station and may fail to determine the downlink path loss between the base station and the first UE without excessive overhead or latency. In another example, the first UE may be outside of the coverage area of any base station and may lack a capability to accurately determine a target received power, a compensation factor, or a combination thereof. In yet another example, the first UE may be inside of the coverage area of the base station, but may communicate with the base station through a first access link associated with a first beam, where the first beam is different than a second beam associated with a second access link between the base station and the second UE. As such, the first UE may measure a downlink path loss value that corresponds to first beam for the first access link but not the second beam for the second access link.

To enable the first UE to determine values of power control parameters that explicitly correspond to the access link between the second UE and the base station, the second UE may transmit an indication of a power control configuration to the first UE. The power control configuration may include an indication of a downlink path loss between the base station and the second UE, an indication of a target received power, an indication of a compensation factor, or a combination thereof. The first UE may use the indication of the power control configuration to adjust one or more power control parameters (e.g., downlink path loss, target received power, compensation factor) and may transmit a transmission to the second UE according to the adjusted one or more power control parameters.

Aspects of the disclosure are initially described in the context of a wireless communications system. Additional aspects of the disclosure are described in the context of additional wireless communications systems and a process flow. Aspects of the disclosure are further illustrated by and described with reference to apparatus diagrams, system diagrams, and flowcharts that relate to sidelink coordination for power control.

FIG. 1 illustrates an example of a wireless communications system 100 that supports sidelink coordination for power control in accordance with one or more aspects of the present disclosure. The wireless communications system 100 includes network devices 105, UEs 115, and a core network 130. In some examples, the wireless communications system 100 may be an LT) network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Network devices 105 (e.g., base stations) may wirelessly communicate with UEs 115 via one or more network device antennas. Network devices 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 120 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130). A UE 115 may communicate with the core network 130 through communication link 155.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, in some cases in the range of 300 megahertz (MHz) to 300 gigahertz (GHz). In some examples, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105.

Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a network device 105 or UE 115 may be located within one or more antenna arrays, which may support MIMO operations, or transmit or receive beamforming. For example, one or more network device antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a first UE 115 may perform sidelink open-loop power control when preparing to transmit a message to a second UE 115. In some examples, the first UE 115 may be configured to use downlink path loss (e.g., between the first UE 115 and a network device 105 within whose coverage area 110 the first UE 115 resides), sidelink path loss (e.g., between the first UE 115 and the second UE 115), or both. When the UE 115 is configured to use both, the minimum of the power values given by the open-look power control may be based on downlink path loss and the open-loop power control based on sidelink path loss may be taken. In such cases, target received power $P_0$ and compensation factor $\alpha$ may be separately configured (e.g., pre-configured) for downlink path loss and uplink path loss.

In some examples, the techniques described herein may involve nearby UEs 115 sharing information (e.g., an indication of a power control configuration) to assist determining power control for sidelink. The UEs 115 may share power control parameters, such as path loss measurements (e.g., from their own cell). The UEs 115 may use the shared path loss measurements to determine transmit power. In some cases, the UEs 115 may also use their own measurement of path loss (e.g., between themselves and a network device 105 whose coverage area 110 they reside in) to determine transmit power. Additionally or alternatively, the UEs 115 may share other power control parameters, such as target received power $P_0$ and compensation factor $\alpha$.

In some cases, the confidential level of the shared information may be determined by pathloss, distance, RSRP, or a combination thereof associated with sidelink communications between a first UE 115 and a second UE 115. A UE 115 that receives the shared information may use the shared information if the path loss is below a threshold, if the distance is below a threshold, or if the RSRP is above a threshold, and may disregard the shared information otherwise. In some cases, the information may be shared based on request by other UEs 115 or by a network device 105 (e.g., the network device 105 whose coverage area 110 the UE 115 receiving the request resides in).

In some examples, to perform power control, a UE 115 may use a target received power $P_0$ and/or a compensation factor $\alpha$. For instance, the UE 115 may calculate sidelink transmit power as $P_{TX}=P_0*L_{SL}^{-\alpha}$, where $P_{TX}$ is the sidelink transmit power and $L_{SL}^{-\alpha}$ is sidelink path loss to the $-\alpha$ power. If a UE 115 has received an indication of the downlink path loss, the UE 115 may use the indicated downlink path loss to calculate $P_0$ and/or $\alpha$. Alternatively, if the UE 115 has received an indication of $P_0$ and/or $\alpha$ values, the UE 115 may use the indicated $P_0$ and/or $\alpha$ values.

In some cases, a UE 115 may communicate with a base station 105 via an access link 127. Additionally or alternatively, a UE 115 may communicate with another UE 115 via a sidelink 128. In some examples, a base station 105 may communicate with a first UE 115 over a first beam and may communicate with a second UE 115 over a second beam. When the first UE 115 communicates with the second UE 115 (e.g., over an access link 128), the first UE 115 may perform power control according to the methods herein to mitigate interference to the base station 105.

In some cases, one or more UEs 115 may include a communications manager 101. In some cases, communications manager 101 may determine a power control configuration corresponding to communication between a first UE 115 and a network device 105, where the first UE 115 is in a coverage area 110 of the network device 105. Communications manager 101 may also transmit an indication of the power control configuration to a second UE 115. Alternatively, communications manager 101 may receive, from a second UE, an indication of a power control configuration corresponding to communication between the second UE 115 and a network device 105. The communications manager 101 may adjust one or more power control parameters of the first UE 115 based on the indication of the power control configuration and may transmit, to the second UE 115, a message based on adjusting the one or more power control parameters.

In some cases, one or more network devices 105 may include a communications manager 102. Communications manager 102 may transmit, to a first UE 115, a command for transmitting, from the first UE 115 and to a second UE 115, an indication of a power control configuration corresponding to communication between the first UE 115 and the network device 105, where the first UE 115 may be within a coverage area of the network device 105 and where the second UE 115 may use the power control configuration to adjust one or more power control parameters.

Figure 2:
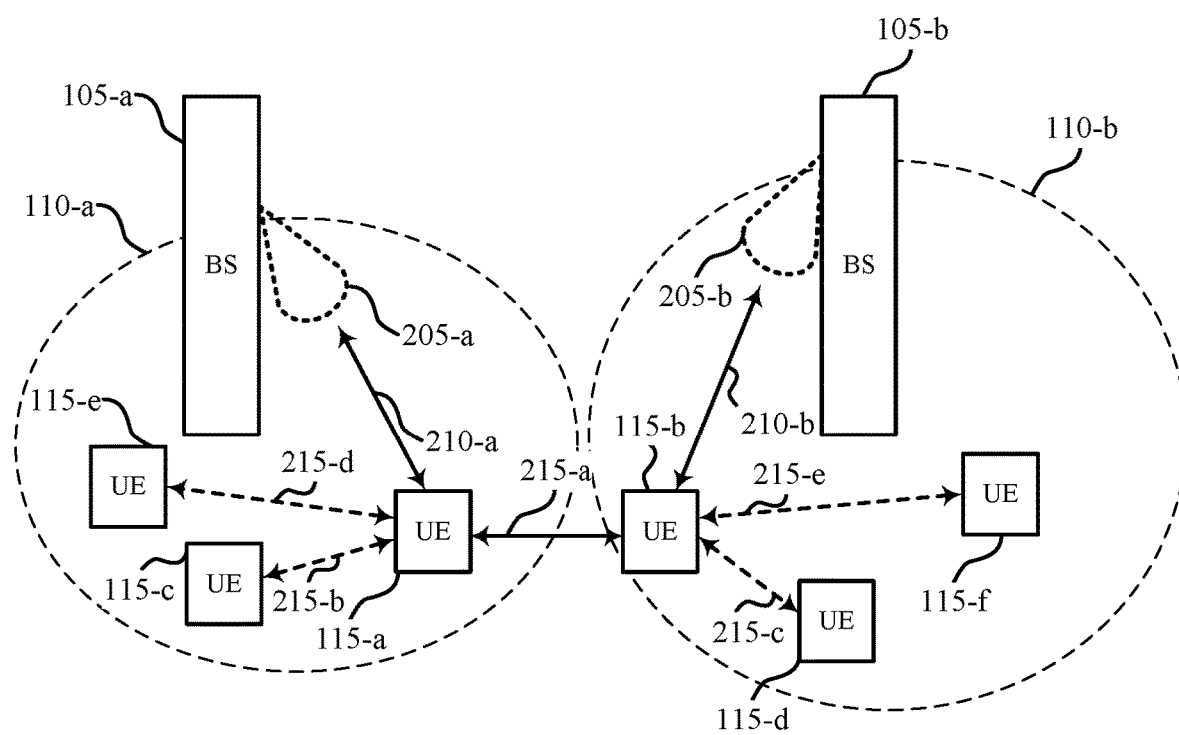
FIG. 2 illustrates an example of a wireless communications system that supports sidelink coordination for power control in accordance with one or more aspects of the present disclosure.

FIG. 2 illustrates an example of a wireless communications system 200 that supports sidelink coordination for power control in accordance with one or more aspects of the present disclosure. In some examples, wireless communications system 200 may implement aspects of wireless communications system 100. For instance, wireless communications system 200 may include network devices 105-a and 105-b, which may be examples of network devices 105 as discussed with reference to FIG. 1, and UEs 115-a, 115-b, 115-c, 115-d, 115-e, and 115-f may be examples of UEs 115 as discussed with reference to FIG. 1.

UEs 115-a, 115-c, and 115-e may be in a coverage area of network device 105-a and UEs 115-b, 115-d, and 115-f may be in a coverage area of network device 105-b. In some examples, network device 105-a may use beam 205-a to receive transmissions from UE 115-a (e.g., via access link 210-a) and network device 105-b may use beam 205-b to receive transmissions from UE 115-b (e.g., via access link 210-b). Additionally, UE 115-a may communicate with UE 115-b via sidelink 215-a, UE 115-c may communicate with UE 115-a via sidelink 215-b, and UE 115-d may communicate with UE 115-b via sidelink 215-c. Similarly, UE 115-e may communicate with UE 115-a via sidelink 215-d, and UE 115-f may communicate with UE 115-b via sidelink 215-e. UEs 115-a and 115-b may be cell-edge UEs 115 (e.g., UEs 115 within a threshold distance from the edge of a coverage area 110) and may perform the techniques as described herein due to being cell-edge UEs 115. In some examples, some or each of the UEs 115 may be replaced with integrated access backhaul (IAB) nodes without deviating of from the scope of the present disclosure.

When UE 115-b transmits a message to UE 115-a (e.g., via sidelink 215-a), UE 115-b may perform power control in an attempt to make transmission power low enough to limit interference at network device 105-a while being high enough for UE 115-a to successfully receive and decode the message. To limit interference, UE 115-b may use path loss between network device 105-a and UE 115-b. However, UE 115-b may be in a different coverage area 110 than network device 105-a. As such, UE 115-b may not be able to measure the path loss between network device 105-a and UE 115-b. One solution may involve network device 105-b and network device 105-a performing coordination such that UE 115-b may determine the path loss. However, such techniques may involve excessive overhead or latency as compared to the techniques described herein.

An alternative solution may involve UE 115-a measuring a path loss between UE 115-a and network device 105-a, and providing an indication of a power control configuration, including an indication of the measured path loss, to UE 115-b (e.g., via sidelink 215-a). UE 115-b may use the indicated path loss as though it were the path loss between UE 115-b and network device 105-a. For instance, UE 115-b may adjust a power control parameter associated with downlink path loss such that the parameter value is equal to the indicated downlink path loss. Alternatively, when adjusting the power control parameter, the adjusted power control parameter value may be different from the indicated path loss to compensate for UE 115-b being in a different location than UE 115-a. In either case, UE 115-b may use the adjusted power control parameter to determine a transmit power for transmitting a message to UE 115-a and may transmit the message to UE 115-a (e.g., via sidelink 215-a). For instance, UE 115-b may use the indicated path loss plus its own measurement of downlink path loss to determine the transmit power.

In some cases, UE 115-b may use the adjusted power control parameter if one or more sidelink proximity parameters associated with communication between UE 115-a and UE 115-b satisfy one or more corresponding thresholds. The one or more sidelink proximity parameters may include a sidelink path loss between UEs 115-a and 115-b; a distance between UEs 115-a and 115-b; a RSRP at UE 115-b; or a combination thereof. In one example, UE 115-b may determine to use the adjusted power control parameter if the sidelink path loss is below a threshold and may disregard the indicated downlink path loss otherwise. Additionally or alternatively, UE 115-b may determine to use the power control parameter if the distance between UEs 115-a and 115-b is below a threshold and may disregard the indicated downlink path loss otherwise. Additionally or alternatively, UE 115-b may determine to use the power control parameter if the RSRP at UE 115-b is higher than a threshold and may disregard the indicated downlink path loss otherwise.

In some cases, UE 115-a may transmit the indication of the power control configuration to a UE 115 within coverage area 110-a (e.g., UE 115-c via sidelink 215-b). Additionally or alternatively, UEs 115 may coordinate in a group (e.g., a group including UEs 115-b, 115-d and 115-f) to share information. For instance, UE 115-b may relay the indication of the power control configuration to another UE 115 in coverage area 110-b (e.g., UE 115-d via sidelink 215-c and/or UE 115-f via sidelink 215-e).

In some cases, network device 105-a may transmit a command to UE 115-a (e.g., via access link 210-a) that triggers UE 115-a to provide the indication of the power control configuration to UE 115-b. Alternatively, UE 115-b may transmit a request to UE 115-a (e.g., via sidelink 215-a) and UE 115-a may transmit the indication of the power control configuration to UE 115-b upon receiving the request (e.g., via sidelink 215-a).

Figure 3:
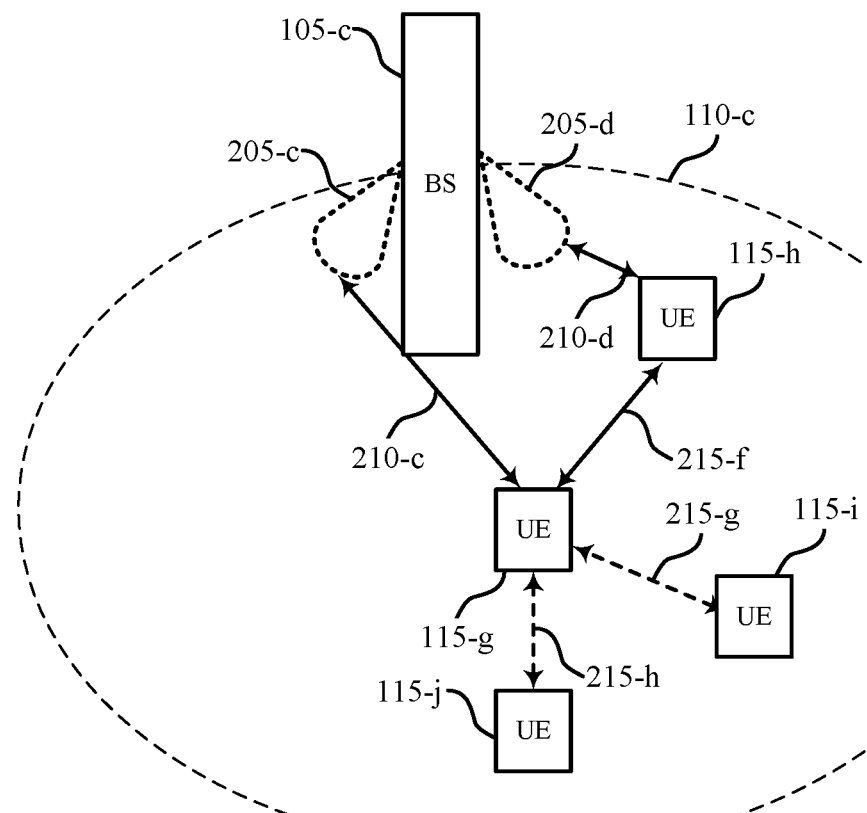
FIG. 3 illustrates an example of a wireless communications system that supports sidelink coordination for power control in accordance with one or more aspects of the present disclosure.

FIG. 3 illustrates an example of a wireless communications system 300 that supports sidelink coordination for power control in accordance with one or more aspects of the present disclosure. In some examples, wireless communications system 300 may implement aspects of wireless communications system 100. For instance, wireless communications system 300 may include network device 105-c, which may be an example of a network device 105 as discussed with reference to FIG. 1, and UEs 115-g, 115-h, 115-I, and 115-j may be examples of UEs 115 as discussed with reference to FIG. 1.

UEs 115-g and 115-h may be in a coverage area 110-c of network device 105-c. In some examples, network device 105-c may use beam 205-c to receive transmissions from UE 115-g (e.g., via access link 210-c) and may use beam 205-d to receive transmissions from UE 115-h (e.g., via access link 210-d). Additionally, UE 115-g may communicate with UE 115-h via sidelink 215-f, may communicate with UE 115-i via sidelink 215-g, and may communicate with UE 115-j via sidelink 215-h. In some examples, some or each of the UEs 115 may be replaced with IAB nodes without deviating of from the scope of the present disclosure.

When UE 115-g transmits a message to UE 115-h (e.g., via sidelink 215-f), UE 115-g may perform power control in an attempt to make transmit power low enough to limit interference at network device 105-c while being high enough for UE 115-a to successfully receive and decode the message. To limit interference, UE 115-g may consider path loss between network device 105-c and UE 115-g. However, UE 115-g may be communicating via beam 205-c and may measure the path loss for transmissions received and transmitted along beam 205-c. However, when UE 115-g transmits the message to UE 115-h, beam 205-d may be more affected by the interference than beam 205-c. In some examples, path loss conditions via beam 205-c may be different than path loss conditions via beam 205-d.

One solution may involve UE 115-h measuring a path loss between UE 115-h and network device 105-c, and providing an indication of a power control configuration, including an indication of the measured path loss, to UE 115-g (e.g., via sidelink 215-f). UE 115-g may use the indicated path loss as though it were the path loss between UE 115-g and network device 105-c. For instance, UE 115-g may adjust a power control parameter associated with downlink path loss such that the parameter value is equal to the indicated downlink path loss. Alternatively, when adjusting the power control parameter, the adjusted power control parameter may be different from the indicated path loss to compensate for UE 115-g being in a different location than UE 115-h and may use the modified path loss. In either case, UE 115-g may use the adjusted power control parameter to determine a transmit power for transmitting a message to UE 115-h. For instance, UE 115-g may use the indicated path loss plus its own measurement of downlink path loss to determine the transmit power.

In some cases, UE 115-g may use the adjusted power control parameter if one or more sidelink proximity parameters associated with communication between UE 115-g and UE 115-h satisfy one or more corresponding thresholds. The one or more sidelink proximity parameters may include a sidelink path loss between UEs 115-g and 115-h; a distance between UEs 115-g and 115-h; an RSRP at UE 115-g; or a combination thereof. In one example, UE 115-b may determine to use the adjusted power control parameter if the sidelink path loss is below a threshold and may disregard the indicated downlink path loss otherwise. Additionally or alternatively, UE 115-g may determine to use the adjusted power control parameter if the distance between UEs 115-g and 115-h is below a threshold and may disregard the indicated downlink path loss otherwise. Additionally or alternatively, UE 115-g may determine to use the adjusted power control parameter if the RSRP at UE 115-g and associated with UE 115-h is higher than a threshold and may disregard the indicated downlink path loss otherwise.

In some cases, UE 115-h may transmit the indication of the power control configuration to another UE 115 within coverage area 110-c (e.g., via a sidelink 215). Additionally or alternatively, UEs 115 may coordinate in a group (e.g., a group including UEs 115-g, 115-I, and 115-j) to share information. For instance, UE 115-g may relay the indication of the power control configuration to another UE 115 in coverage area 110-c (e.g., UE 115-i via sidelink 215-g and/or UE 115-j via sidelink 215-h).

In some cases, network device 105-c may transmit a command to UE 115-h that triggers UE 115-h to provide the indication of the power control configuration to UE 115-g (e.g., via access link 210-d). Alternatively, UE 115-g may transmit a request to UE 115-h (e.g., via sidelink 215-f) and UE 115-h may transmit the indication of the power control configuration to UE 115-g upon receiving the request (e.g., via sidelink 215-f).

Figure 4:
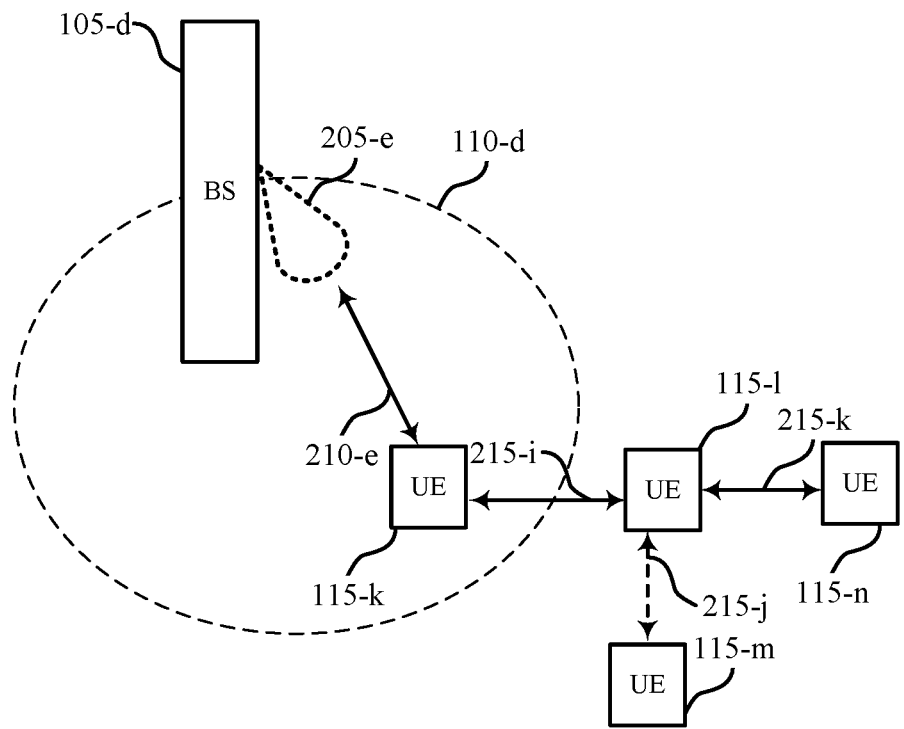
FIG. 4 illustrates an example of a wireless communications system that supports sidelink coordination for power control in accordance with one or more aspects of the present disclosure.

FIG. 4 illustrates an example of a wireless communications system 400 that supports sidelink coordination for power control in accordance with one or more aspects of the present disclosure. In some examples, wireless communications system 400 may implement aspects of wireless communications system 100. For instance, wireless communications system 400 may include network device 105-d, which may be an example of a network device 105 as discussed with reference to FIG. 1, and UEs 115-k, 115-l, 115-m, and 115-n may be examples of UEs 115 as discussed with reference to FIG. 1.

UEs 115-k may be in a coverage area of network device 105-d (i.e., an in-coverage UE 115) and UE 115-l may be outside of a coverage area of any network devices 105 (i.e., an out-of-coverage (OOC) UE 115). In some examples, network device 105-d may use beam 205-e to receive transmissions from UE 115-k (e.g., via access link 210-e). Additionally, UE 115-l may communicate with UE 115-k via sidelink 215-i, may communicate with UE 115-m via sidelink 215-j, and may communicate with UE 115-n via sidelink 215-k. In some examples, some or each of the UEs 115 may be replaced with IAB nodes without deviating of from the scope of the present disclosure.

UE 115-l, being an OOC UE 115, may be too far away from network device 105-d to sustain direct communications with network device 105-d. However, if UE 115-l transmits a message to UE 115-h, UE 115-k may relay that message to network device 105-d. When UE 115-l transmits a message to UE 115-h, UE 115-l may perform power control in an attempt to make transmit power low enough to limit interference at network device 105-d while being high enough for UE 115-k to successfully receive and decode the message.

In some examples, to perform power control, UE 115-l may use a target received power $P_0$ and/or a compensation factor $\alpha$. For instance, UE 115-l may calculate sidelink transmit power as $P_{TX}=P_0*L_{SL}^{-\alpha}$, where $P_{TX}$ is the sidelink transmit power and $L_{SL}^{-\alpha}$ is sidelink path loss to the $-\alpha$ power. Typical methods of attaining values for $P_0$ and $\alpha$ may involve communicating with a network device 105 (e.g., via an access link 210). For instance, UE 115-l may determine $P_0$ and $\alpha$ based on downlink pathloss (e.g., between UE 115-l and network device 105-d) or interference considerations. However, as UE 115-l is an OOC UE 115, UE 115-l may not be able to perform these methods.

One solution may involve UE 115-l retrieving these parameters from UE 115-k via a power control configuration transmitted from UE 115-k (e.g., via sidelink 215-i). In one example, UE 115-k may transmit an indication of a power control configuration that includes indications of $P_0$ and $\alpha$ values (e.g., via sidelink 215-i). UE 115-l may adjust previously determined $P_0$ and $\alpha$ to be aligned with the indicated $P_0$ and $\alpha$ values. UE 115-l may determine the transmit power and may transmit the message to UE 115-k based on the determined transmit power (e.g., via sidelink 215-i). For instance, UE 115-l may use the indicated path loss plus its own measurement of downlink path loss to determine the transmit power. It should be noted that, in some cases, UE 115-l may alternatively receive an indication of downlink path loss (e.g., between UE 115-k and network device 105-d) and may calculate $P_0$ and $\alpha$ according to the indicated downlink path loss.

In some cases, UE 115-l may use the indicated $P_0$ and/or $\alpha$ values if one or more sidelink proximity parameters associated with communication between UE 115-k and UE 115-l satisfy one or more corresponding thresholds. The one or more sidelink proximity parameters may include a sidelink path loss between UEs 115-k and 115-i; a distance between UEs 115-l and 115-h; a RSRP at UE 115-l; or a combination thereof. In one example, UE 115-l may determine to use the indicated $P_0$ and/or $\alpha$ values if the sidelink path loss is below a threshold and may disregard the indicated downlink path loss otherwise. Additionally or alternatively, UE 115-l may determine to use the indicated $P_0$ and/or $\alpha$ values if the distance between UEs 115-l and 115-k is below a threshold and may disregard the indicated downlink path loss otherwise. Additionally or alternatively, UE 115-l may determine to use the indicated $P_0$ and/or $\alpha$ values if the RSRP at UE 115-l and associated with UE 115-k is higher than a threshold and may disregard the indicated downlink path loss otherwise.

In some cases, UEs 115 may coordinate in a group (e.g., a group including UEs 115-l, 115-m, and 115-n) to share information. For instance, UE 115-l may relay the power control configuration to another OOC UE 115 (e.g., UE 115-m via sidelink 215-j and/or UE 115-n via sidelink 215-k). In some cases, network device 105-d may transmit a command to UE 115-k that triggers UE 115-k to provide the power control parameters to UE 115-l (e.g., via sidelink 215-i). To enable network device 105-d to transmit the command, network device 105-d may identify the group of UEs 115 (e.g., UEs 115-l, 115-m, and 115-n) and may determine that UE 115-l is OOC. In some such examples, network device 105-d may receive a message from UE 115-k identifying the group of UEs 115 and may determine UE 115-*l* is OOC based on the received message. Alternatively, UE 115-*l* may transmit a request to UE 115-*k* (e.g., via sidelink 215-*i*) and UE 115-*k* may transmit the power control parameters to UE 115-*l* upon receiving the request (e.g., via sidelink 215-*i*).

Figure 5:
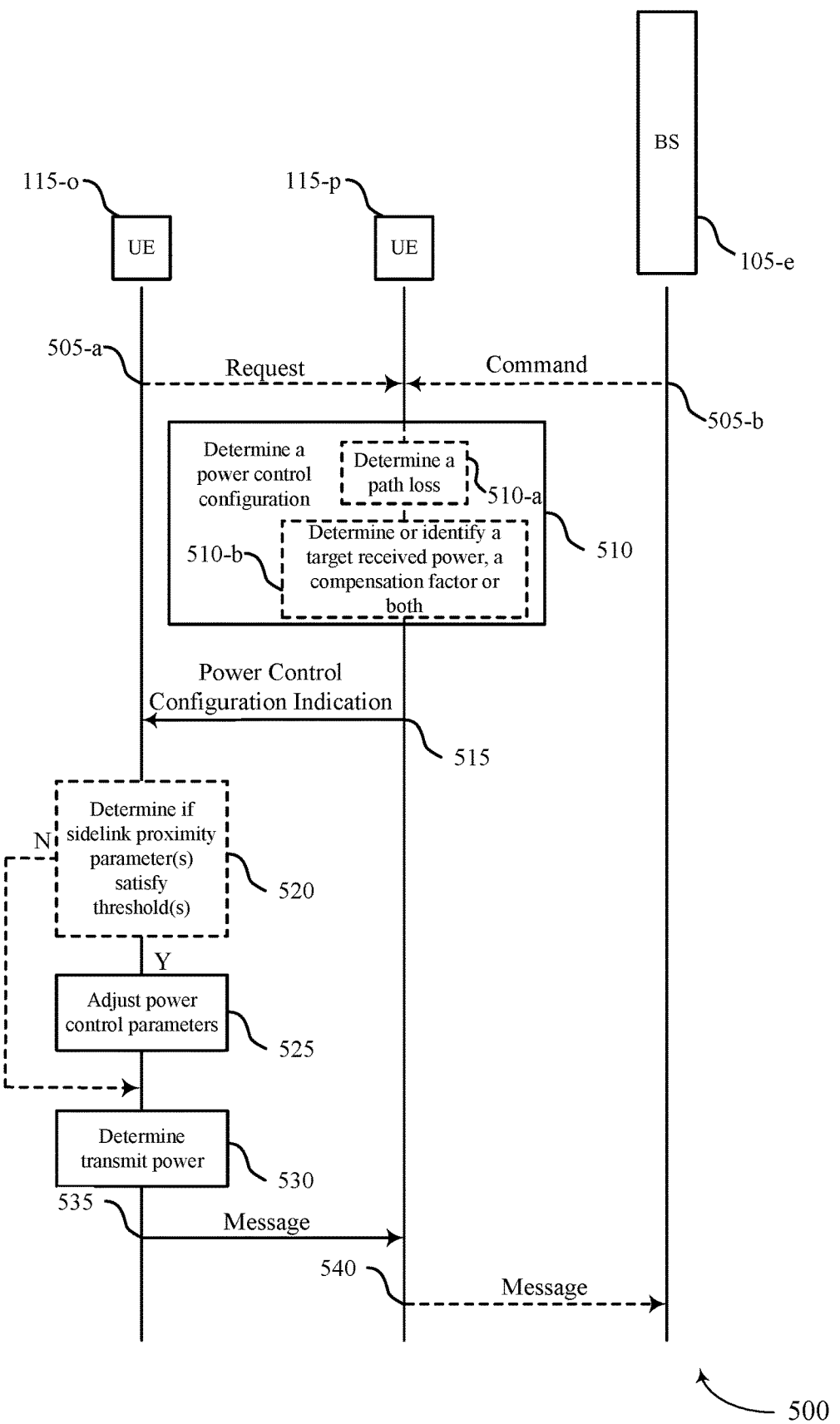
FIG. 5 illustrates an example of a process flow that supports sidelink coordination for power control in accordance with one or more aspects of the present disclosure.

FIG. 5 illustrates an example of a process flow 500 that supports sidelink coordination for power control in accordance with one or more aspects of the present disclosure. In some examples, process flow 500 may implement aspects of wireless communications system 100. For instance, process flow 500 may be implemented by UEs 115-*o* and 115-*p*, which may be examples of UEs 115 as described with reference to FIG. 1, and may also be implemented by network device 105-*e*, which may be an example of a network device 105 as described with reference to FIG. 1. UE 115-*p* may be within a coverage area 110 of network device 105-*e* and UE 115-*o* may be within or outside of the coverage area 110 of network device 105-*e*.

At 505-*a*, UE 115-*o* may transmit a request for an indication of a power control configuration to UE 115-*p*. Alternatively, at 505-*b*, network device 105-*e* may transmit a command to UE 115-*p* for transmitting the indication of the power control configuration to UE 115-*o*. Alternatively, UE 115-*p* may proceed to 510 without receiving a request from UE 115-*o* or a command from network device 105-*e*.

At 510, UE 115-*p* may determine the power control configuration. The power control configuration may correspond to communication between the UE 115-*p* and network device 105-*e* (e.g., an access link). At 510-*a*, UE 115-*p* may determine a path loss associated with communication between UE 115-*p* and network device 105-*e* (e.g., a downlink path loss) and may include the indication of the path loss in the power control configuration. Additionally or alternatively, at 510-*b*, UE 115-*p* may determine or identify a target received power $P_0$, a compensation factor $\alpha$, or both and may include the indication of the target received power $P_0$, an indication of the compensation factor $\alpha$, or both in the power control configuration.

At 515, UE 115-*p* may transmit an indication of the power control configuration to UE 115-*o*. UE 115-*o* may receive the indication of the power control configuration.

At 520, UE 115-*o* may determine whether one or more sidelink proximity parameters associated with communication between UEs 115-*o* and 115-*p* satisfy one or more corresponding thresholds. For instance, if the one or more sidelink proximity parameters include a sidelink path loss between UEs 115-*o* and 115-*p*, UE 115-*o* may determine whether or not the path loss is below a threshold sidelink path loss. Additionally or alternatively, if the one or more sidelink proximity parameters include a distance between UEs 115-*o* and 115-*p*, UE 115-*o* may determine whether the distance is below a threshold distance. Additionally or alternatively, if the one or more sidelink proximity parameters include an RSRP at UE 115-*o*, UE 115-*o* may determine whether the RSRP is above the an RSRP threshold. If the one or more thresholds are satisfied, UE 115-*o* may proceed to 525. If not, UE 115-*o* may proceed to 530. In cases where 520 is not performed, UE 115-*o* may proceed to 525 regardless of whether or not sidelink proximity parameters satisfy corresponding thresholds.

At 525, UE 115-*o* may adjust one or more power control parameters of UE 115-*o* based on the indication of the power control configuration.

At 530, UE 115-*o* may determine a transmit power based on the adjusted one or more power control parameters. In some cases, UE 115-*o* may determine the transmit power based on a path loss associated with communication between UE 115-*o* and 115-*p* (e.g., a sidelink pathloss). In some cases, the transmit power may be linearly proportional to the indicated target received power and exponentially proportional to the indicated compensation factor.

At 535, UE 115-*o* may transmit, to UE 115-*p*, a message based on adjusting the one or more power control parameters. UE 115-*p* may receive the message.

At 540, UE 115-*p* may relay the message to network device 105-*e*. In some cases, UE 115-*p* may relay the message if UE 115-*o* is an OOC UE 115, such as described with reference to FIG. 4.

Figure 6:
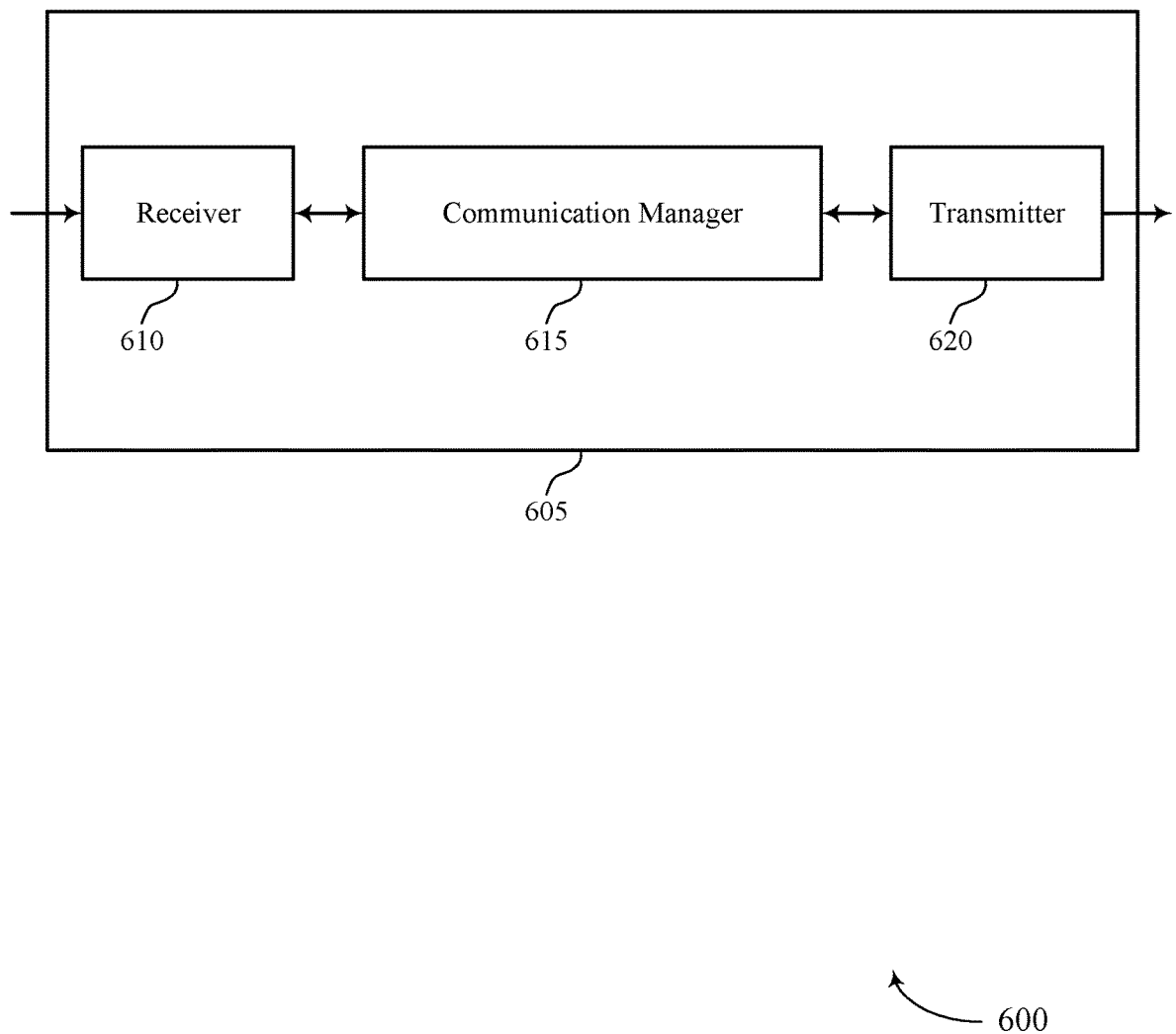
FIGS. 6 and 7 show block diagrams of devices that support sidelink coordination for power control in accordance with one or more aspects of the present disclosure.

FIG. 6 shows a block diagram 600 of a device 605 that supports sidelink coordination for power control in accordance with one or more aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may provide a means for receiving information such as packets, user data, or control information associated with various information channels (e.g., control channels, data channels, and information related to sidelink coordination for power control, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may support wireless communication in accordance with examples as disclosed herein. For example, the communication manager 615 may be configured to provide or support a means for determining a power control configuration corresponding to communication between the first UE and a base station, where the first UE is within a coverage area of the base station and a means for transmitting an indication of the power control configuration to a second UE, where the second UE uses the power control configuration to adjust one or more power control parameters. The communication manager 615 may also be configured to provide or support a means for receiving, from a second UE, an indication of a power control configuration corresponding to communication between the second UE and a base station, the second UE being within the coverage area of the base station, a means for adjusting one or more power control parameters of the first UE based on the indication of the power control configuration, and a means for transmitting, to the second UE, a message based on adjusting the one or more power control parameters. The communication manager 615 may be an example of aspects of the communication manager 910 described herein. The methods performed by communication manager 615 may have one or more advantages. For instance, the communication manager 615 communicating the power control configuration may enable a UE to perform power control for sidelink transmissions without directly communicating with a base station.

The communications manager 615 may be an example of means for performing various aspects of sidelink coordination for power control as described herein. The communication manager 615, or its sub-components, may be implemented in hardware, code (e.g., software or firmware) executed by a processor, or any combination thereof. The communications manager 615, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, an FPGA, or other programmable logic device.

In some examples, the communication manager 615 may be configured to perform various operations (e.g., receiving, monitoring, transmitting, determining, adjusting) using or otherwise in cooperation with the receiver 610, the transmitter 620, or both.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may provide a means for transmitting signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
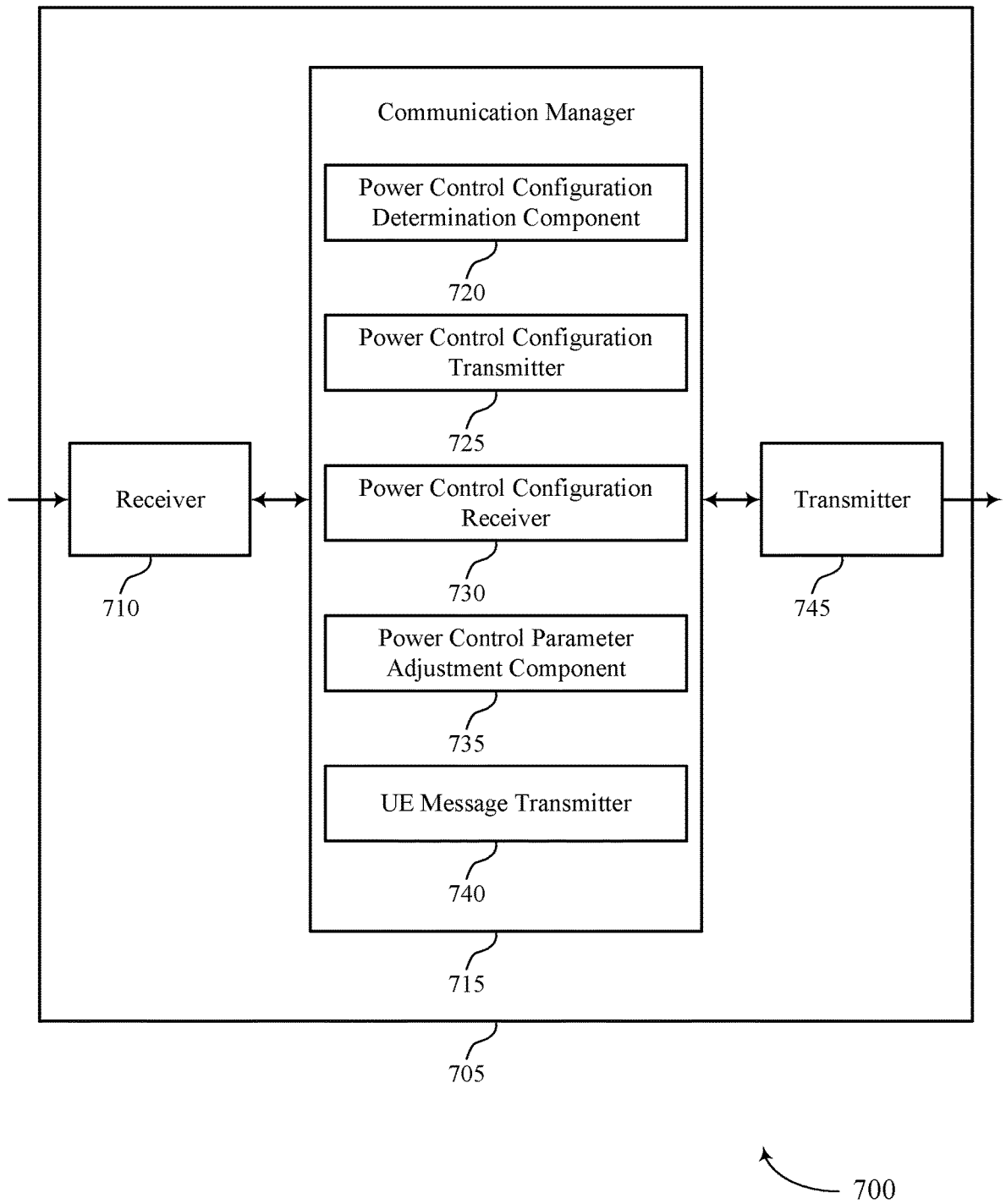

FIG. 7 shows a block diagram 700 of a device 705 that supports sidelink coordination for power control in accordance with one or more aspects of the present disclosure. The device 705 may be an example of aspects of a device 605, or a UE 115 as described herein. The device 705 may include a receiver 710, a communication manager 715, and a transmitter 745. The device 705 may also include a processor. Each of these components may be in communication with one another (e.g., via one or more buses).

The receiver 710 may provide a means for receiving information such as packets, user data, or control information associated with various information channels (e.g., control channels, data channels, and information related to sidelink coordination for power control, etc.). Information may be passed on to other components of the device 705. The receiver 710 may be an example of aspects of the transceiver 915 described with reference to FIG. 9. The receiver 710 may utilize a single antenna or a set of antennas.

The communication manager 715, or components thereof, may be an example of aspects of means of performing sidelink coordination for power control as described herein. The communication manager 715 may include a power control configuration determination component 720, a power control configuration transmitter 725, a power control configuration receiver 730, a power control parameter adjustment component 735, and an UE message transmitter 740. The communication manager 715 may be an example of aspects of the communication manager 615 and/or 910 as described herein. In some examples, the communication manager 715 may be configured to perform various operations (e.g., receiving, monitoring, transmitting) using or otherwise in cooperation with one or both of the receiver 710 or the transmitter 745.

The power control configuration determination component 720 may be configured to provide or support a means for determining a power control configuration corresponding to communication between the first UE and a base station, where the first UE is within a coverage area of the base station.

The power control configuration transmitter 725 may be configured to provide or support a means for transmitting an indication of the power control configuration to a second UE, where the second UE uses the power control configuration to adjust one or more power control parameters.

The power control configuration receiver 730 may be configured to provide or support a means for receiving, from a second UE, an indication of a power control configuration corresponding to communication between the second UE and a base station, the second UE being within the coverage area of the base station.

The power control parameter adjustment component 735 may be configured to provide or support a means for adjusting one or more power control parameters of the first UE based on the indication of the power control configuration.

The UE message transmitter 740 may be configured to provide or support a means for transmitting, to the second UE, a message based on adjusting the one or more power control parameters.

The transmitter 745 may provide a means for transmitting signals generated by other components of the device 705. In some examples, the transmitter 745 may be collocated with a receiver 710 in a transceiver module. For example, the transmitter 745 may be an example of aspects of the transceiver 915 described with reference to FIG. 9. The transmitter 745 may utilize a single antenna or a set of antennas.

Figure 8:
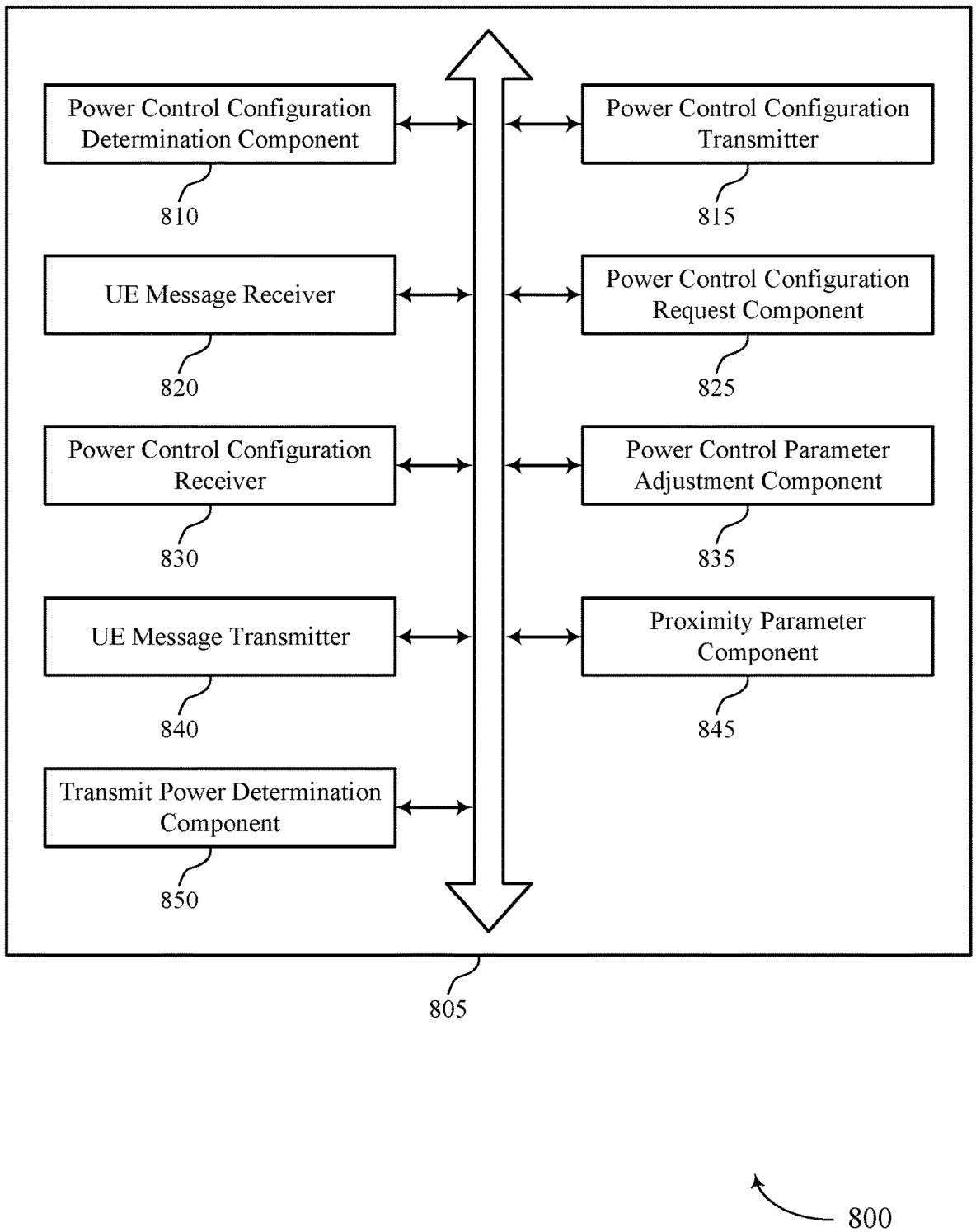
FIG. 8 shows a block diagram of a communication manager that supports sidelink coordination for power control in accordance with one or more aspects of the present disclosure.

FIG. 8 shows a block diagram 800 of a communication manager 805 that supports sidelink coordination for power control in accordance with one or more aspects of the present disclosure. The communication manager 805 may be an example of aspects of a communication manager 615, a communication manager 715, a communication manager 910 described herein, or any combination thereof as described herein. The communication manager 805, or various components thereof, may be an example of means for performing various aspects of sidelink coordination for power control as described herein. The communication manager 805 may include a power control configuration determination component 810, a power control configuration transmitter 815, an UE message receiver 820, a power control configuration request component 825, a power control configuration receiver 830, a power control parameter adjustment component 835, an UE message transmitter 840, a proximity parameter component 845, and a transmit power determination component 850. Each of these modules may communicate, directly or indirectly, with one another (e.g., via one or more buses).

The power control configuration determination component 810 may be configured to provide or support a means for determining a power control configuration corresponding to communication between the first UE and a base station, where the first UE is within a coverage area of the base station. In some examples, the power control configuration determination component 810 may be configured to provide or support a means for determining a path loss associated with the communication between the first UE and the base station, where the power control configuration includes an indication of the path loss. In some cases, the power control configuration includes an indication of a target received power, an indication of a compensation factor, or a combination thereof.

The power control configuration transmitter 815 may be configured to provide or support a means for transmitting an indication of the power control configuration to a second UE, where the second UE uses the power control configuration to adjust one or more power control parameters. In some examples, the power control configuration transmitter 815 may be configured to provide or support a means for transmitting the power control configuration to a third UE. In some examples, the power control configuration transmitter 815 may be configured to provide or support a means for transmitting, to the second UE, the indication of the power control configuration based on the request. In some examples, the power control configuration transmitter 815 may be configured to provide or support a means for transmitting, to the second UE, the indication of the power control configuration based on the command.

The UE message receiver 820 may be configured to provide or support a means for receiving, from the second UE, a message based on the indication of the power control configuration.

The power control configuration request component 825 may be configured to provide or support a means for receiving, from the second UE, a request for the indication of the power control configuration. In some examples, the power control configuration request component 825 may be configured to provide or support a means for receiving, from the base station, a command for transmitting the indication of the power control configuration.

The power control configuration receiver 830 may be configured to provide or support a means for receiving, from a second UE, an indication of a power control configuration corresponding to communication between the second UE and a base station, the second UE being within the coverage area of the base station. In some examples, the power control configuration receiver 830 may be configured to provide or support a means for receiving the indication of the power control configuration based on transmitting the request. In some examples, the power control configuration receiver 830 may be configured to provide or support a means for transmitting the message to the second UE based on the determined transmit power.

The power control parameter adjustment component 835 may be configured to provide or support a means for adjusting one or more power control parameters of the first UE based on the indication of the power control configuration. In some examples, the power control parameter adjustment component 835 may be configured to provide or support a means for adjusting the one or more power control parameters of the first UE based on the indication of the downlink path loss. In some examples, the power control parameter adjustment component 835 may be configured to provide or support a means for adjusting the one or more power control parameters of the first UE based on the indication of the target received power, the indication of the compensation factor, or a combination thereof. In some examples, the power control parameter adjustment component 835 may be configured to provide or support a means for adjusting the one or more power control parameters based on the one or more sidelink proximity parameters satisfying the one or more corresponding thresholds. In some examples, the power control parameter adjustment component 835 may be configured to provide or support a means for adjusting the one or more power control parameters based on the path loss being below the threshold path loss. In some examples, the power control parameter adjustment component 835 may be configured to provide or support a means for adjusting the one or more power control parameters based on the distance being below the threshold distance. In some examples, the power control parameter adjustment component 835 may be configured to provide or support a means for adjusting the one or more power control parameters based on the RSRP being above the RSRP threshold.

The UE message transmitter 840 may be configured to provide or support a means for transmitting, to the second UE, a message based on adjusting the one or more power control parameters. In some examples, the UE message transmitter 840 may be configured to provide or support a means for transmitting the message to the second UE based on the indication of the path loss. In some examples, the UE message transmitter 840 may be configured to provide or support a means for transmitting the message to the second UE based on the indication of the target received power, the indication of the compensation factor, or a combination thereof. In some examples, the power control configuration request component 825 may be configured to provide or support a means for transmitting, to the second UE, a request for the indication of the power control configuration. In some examples, the UE message transmitter 840 may be configured to provide or support a means for determining a group of UEs including the second UE; a means for transmitting, to the base station, a message from the first UE determining the group of UEs and a means for indicating that the second UE is outside of the coverage area of the base station.

The proximity parameter component 845 may be configured to provide or support a means for determining that one or more sidelink proximity parameters associated with communication between the first UE and the second UE satisfy one or more corresponding thresholds. In some examples, the proximity parameter component 845 may be configured to provide or support a means for determining that the path loss is below a threshold path loss. In some examples, the proximity parameter component 845 may be configured to provide or support a means for determining that the distance is below a threshold distance. In some examples, the proximity parameter component 845 may be configured to provide or support a means for determining that the RSRP is above an RSRP threshold.

The transmit power determination component 850 may be configured to provide or support a means for determining a transmit power based on the adjusted one or more power control parameters. In some examples, the transmit power determination component 850 may be configured to provide or support a means for determining a path loss associated with communication between the first UE and the second UE. In some examples, the transmit power determination component 850 may be configured to provide or support a means for determining the transmit power based on the path loss. In some cases, the indication of the power control configuration includes an indication of a target received power, an indication of a compensation factor, or a combination thereof, where the transmit power is linearly proportional to the indicated target received power, exponentially proportional to the indicated compensation factor, or a combination thereof.

Figure 9:
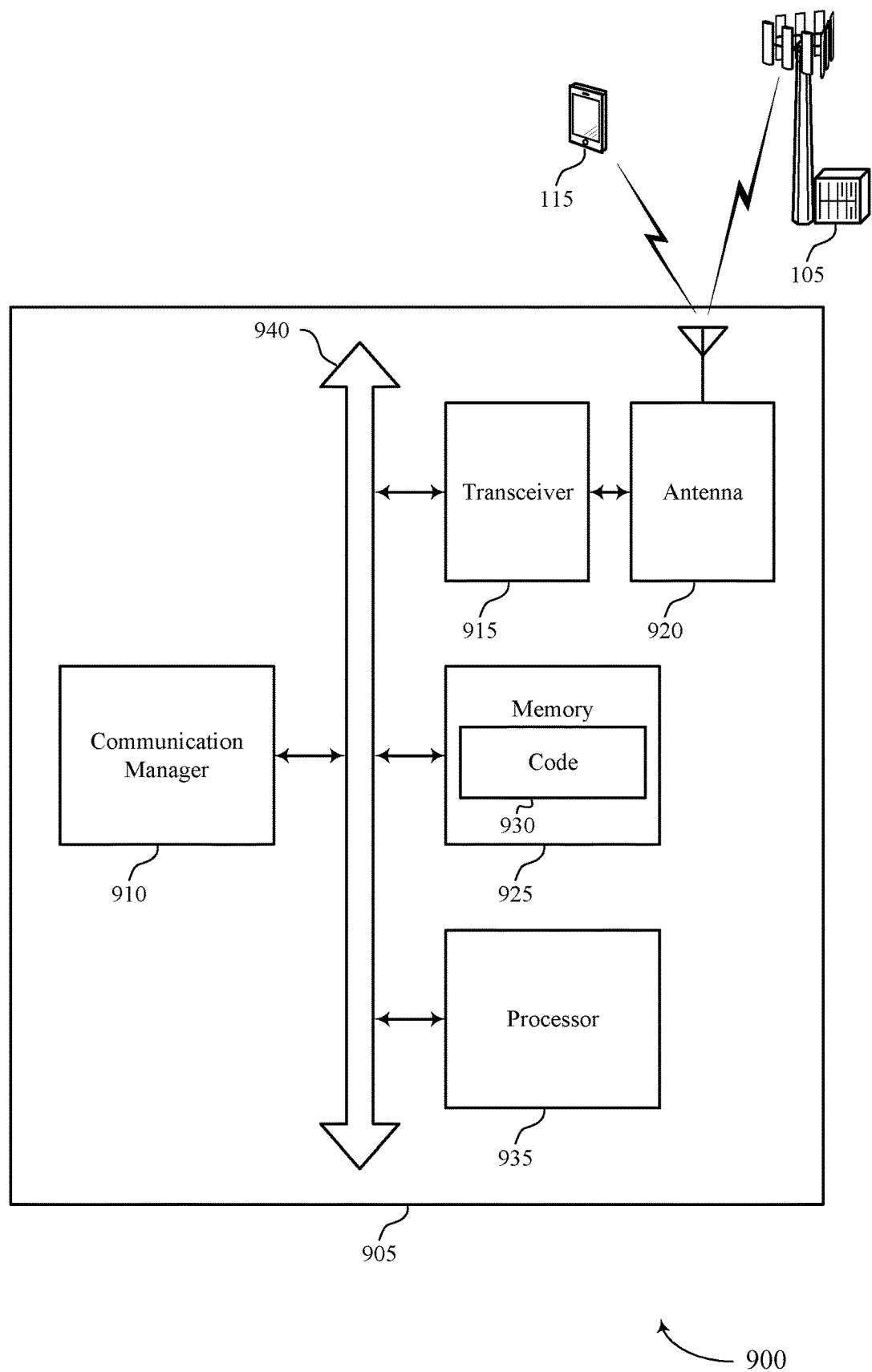
FIG. 9 shows a diagram of a system including a device that supports sidelink coordination for power control in accordance with one or more aspects of the present disclosure.

FIG. 9 shows a diagram of a system 900 including a device 905 that supports sidelink coordination for power control in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communications manager 910, or various components thereof, may be an example of means for performing various aspects of sidelink coordination for power control as described herein. For example, the communication manager 910 may be configured to provide or support a means for determining a power control configuration corresponding to communication between the first UE and a base station, where the first UE is within a coverage area of the base station and a means for transmitting an indication of the power control configuration to a second UE, where the second UE uses the power control configuration to adjust one or more power control parameters. The communication manager 910 may also be configured to provide or support a means for receiving, from a second UE, an indication of a power control configuration corresponding to communication between the second UE and a base station, the second UE being within the coverage area of the base station, a means for adjusting one or more power control parameters of the first UE based on the indication of the power control configuration, and a means for transmitting, to the second UE, a message based on adjusting the one or more power control parameters.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting sidelink coordination for power control).

In some examples, the communication manager 910 may be configured to perform various operations (e.g., receiving, monitoring, transmitting) using or otherwise in cooperation with one or both of the transceiver 915 or the one or more antennas 920. Although the communication manager 910 is illustrated as a separate component, in some examples, one or more functions described with reference to the communication manager 910 may be supported by or performed by the processor 935, the memory 925, the code 930, or any combination thereof. For example, the code 930 may include instructions executable by the processor 935 to cause the device 905 to perform various aspects of sidelink coordination for power control as described herein, or the processor 935 and the memory 925 may be otherwise configured to perform or support such operations.

Figure 10:
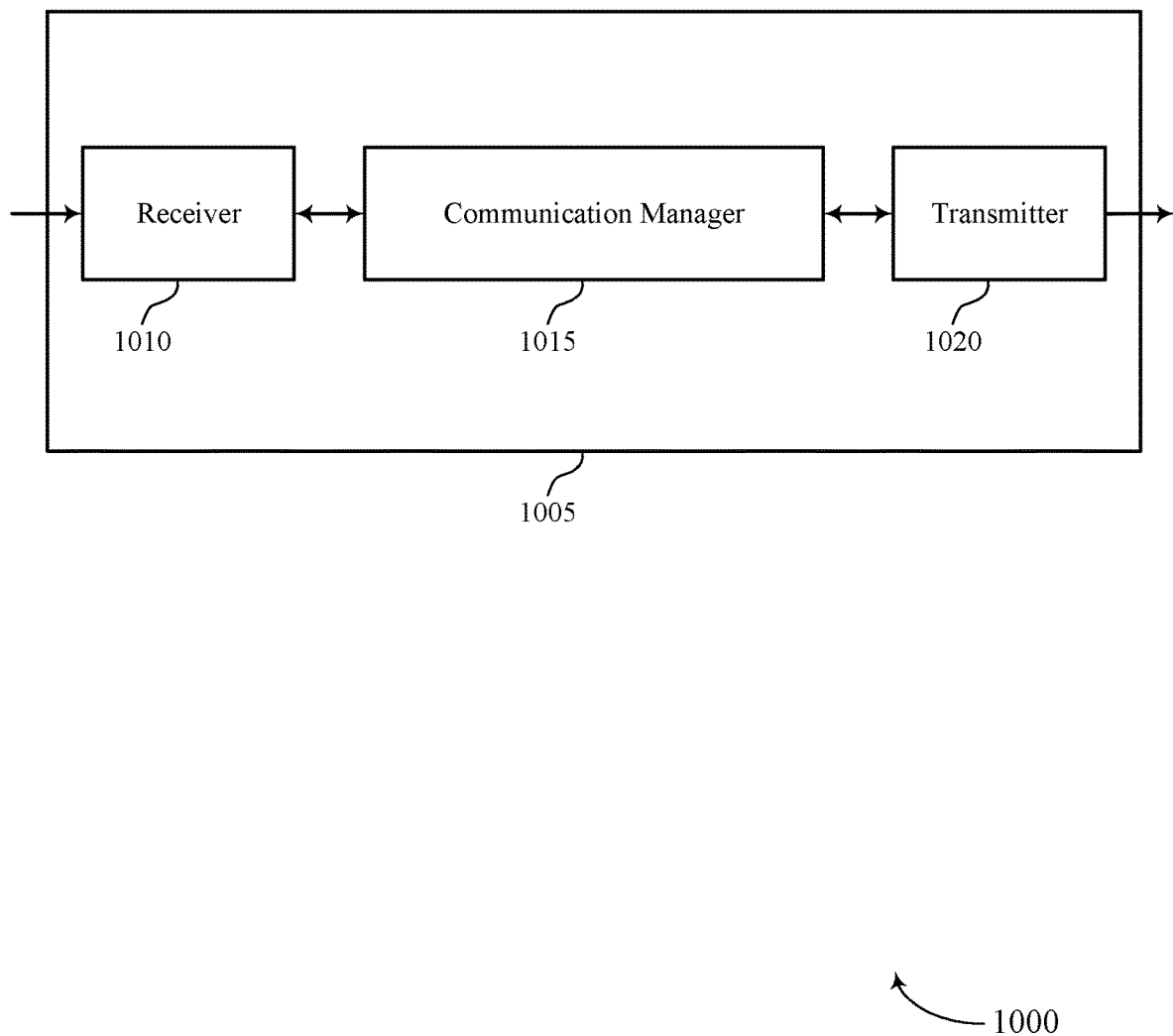
FIGS. 10 and 11 show block diagrams of devices that support sidelink coordination for power control in accordance with one or more aspects of the present disclosure.

FIG. 10 shows a block diagram 1000 of a device 1005 that supports sidelink coordination for power control in accordance with one or more aspects of the present disclosure. The device 1005 may be an example of aspects of a network device 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink coordination for power control, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may be configured to provide or support a means for receiving a message from a first UE identifying a group of UEs; a means for determining at least a second UE of the group of UEs is out of coverage of the base station based on the message; and a means for transmitting, to the first UE, a command for transmitting, from the first UE and to the second UE, an indication of a power control configuration corresponding to communication between the first UE and the base station, where the first UE is within a coverage area of the base station, and where the second UE uses the power control configuration to adjust one or more power control parameters. The communication manager 1015 may be an example of aspects of the communication manager 1310 described herein. The methods performed by communication manager 1015 may have one or more advantages. For instance, the communication manager 1015 communicating the power control configuration may enable a UE (e.g., the second UE) to perform power control for sidelink transmissions without directly communicating with communication manager 1015. Additionally, the methods described herein may enable communication manager 1015 to manage power control at a UE (e.g., the second UE) that is in another cell or is OOC.

The communications manager 1015 may be an example of means for performing various aspects of sidelink coordination for power control as described herein. The communication manager 1015, or its sub-components, may be implemented in hardware, code (e.g., software or firmware) executed by a processor, or any combination thereof. The communications manager 1015, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 1015, or its sub-components, may be implemented in code (e.g., as communications management software or firmware) executed by a processor, or any combination thereof. If implemented in code executed by a processor, the functions of the communications manager 1015, or its sub-components may be executed by a general-purpose processor, a DSP, an ASIC, an FPGA, or other programmable logic device.

In some examples, the communication manager 1015 may be configured to perform various operations (e.g., receiving, monitoring, transmitting, determining, adjusting) using or otherwise in cooperation with the receiver 1010, the transmitter 1020, or both.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
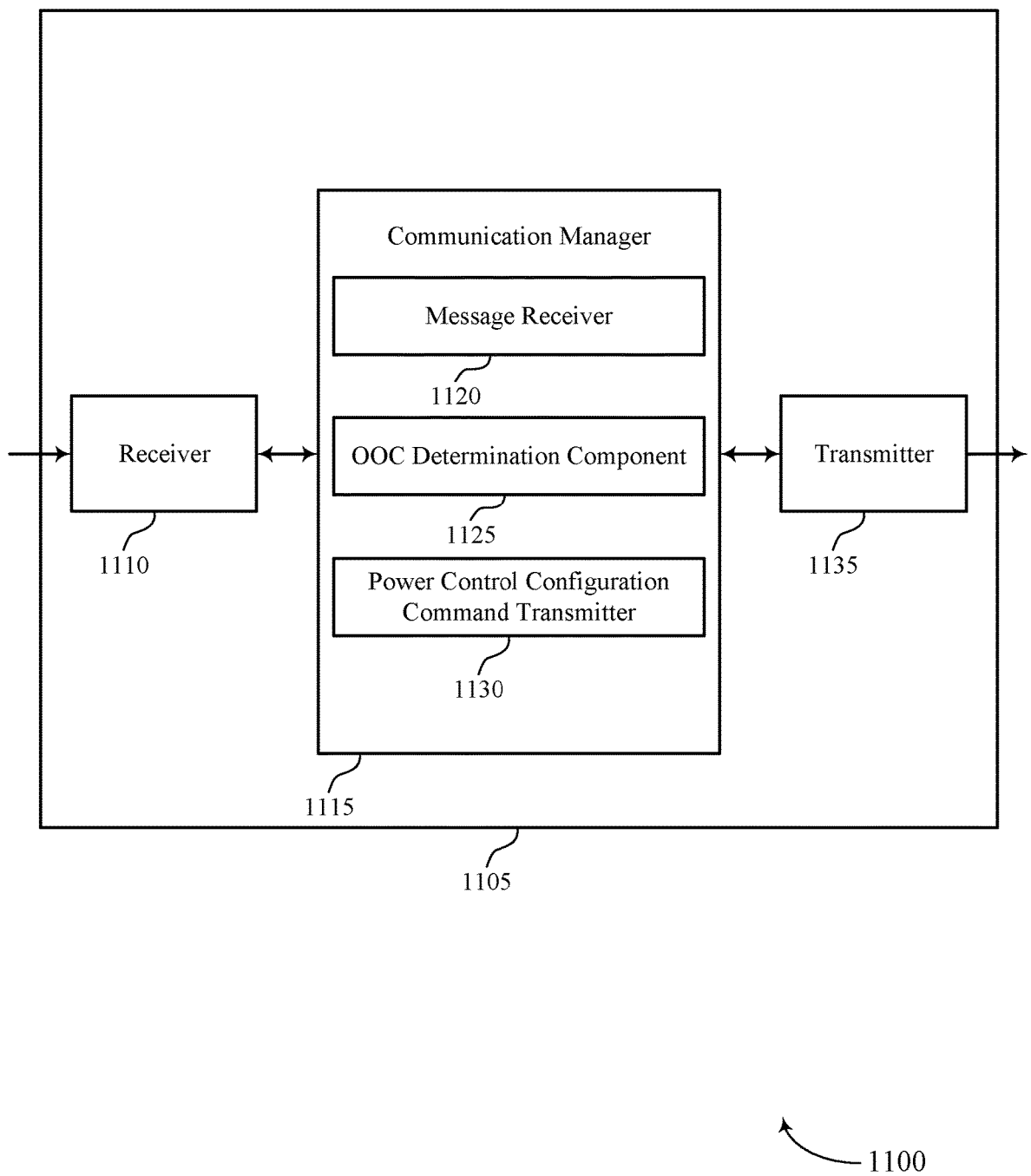

FIG. 11 shows a block diagram 1100 of a device 1105 that supports sidelink coordination for power control in accordance with one or more aspects of the present disclosure. The device 1105 may be an example of aspects of a device 1005, or a network device 105 as described herein. The device 1105 may include a receiver 1110, a communication manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink coordination for power control, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a message receiver 1120, an OOC determination component 1125, and a power control configuration command transmitter 1130. The communication manager 1115 may be an example of aspects of the communication manager 1310 described herein.

The message receiver 1120 may be configured to provide or support a means for receiving a message from a first UE identifying a group of UEs.

The OOC determination component 1125 may be configured to provide or support a means for determining at least a second UE of the group of UEs is out of coverage of the base station based on the message.

The power control configuration command transmitter 1130 may be configured to provide or support a means for transmitting, to the first UE, a command for transmitting, from the first UE and to the second UE, an indication of a power control configuration corresponding to communication between the first UE and the base station, where the first UE is within a coverage area of the base station, and where the second UE uses the power control configuration to adjust one or more power control parameters.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
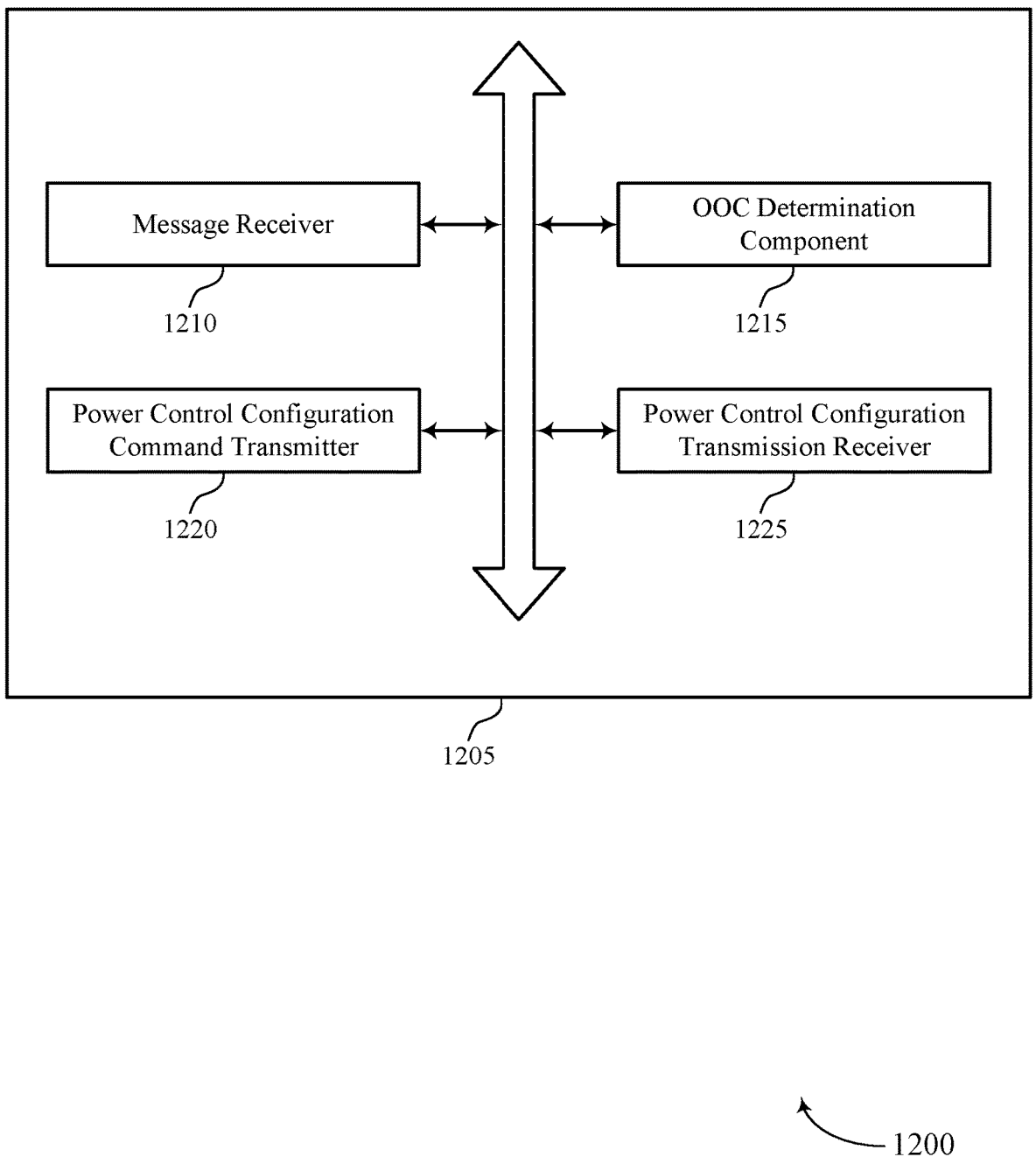
FIG. 12 shows a block diagram of a communication manager that supports sidelink coordination for power control in accordance with one or more aspects of the present disclosure.

FIG. 12 shows a block diagram 1200 of a communication manager 1205 that supports sidelink coordination for power control in accordance with one or more aspects of the present disclosure. The communication manager 1205 may be an example of aspects of a communication manager 1015, a communication manager 1115, or a communication manager 1310 described herein. The communication manager 1205 may include a message receiver 1210, an OOC determination component 1215, power control configuration command transmitter 1220 and a power control configuration transmission receiver 1225. Each of these modules may communicate, directly or indirectly, with one another (e.g., via one or more buses).

The message receiver 1210 may be configured to provide or support a means for receiving a message from a first UE identifying a group of UEs.

The OOC determination component 1215 may be configured to provide or support a means for determining at least a second UE of the group of UEs is out of coverage of the base station based on the message.

The power control configuration command transmitter 1220 may be configured to provide or support a means for transmitting, to the first UE, a command for transmitting, from the first UE and to the second UE, an indication of a power control configuration corresponding to communication between the first UE and the base station, where the first UE is within a coverage area of the base station, and where the second UE uses the power control configuration to adjust one or more power control parameters. In some cases, the power control configuration includes an indication of a target received power, an indication of a compensation factor, or a combination thereof, and where the transmission is received based on the power control configuration including the indication of the target received power, the indication of the compensation factor, or the combination thereof. In some cases, the power control configuration includes an indication of a path loss corresponding to communication between the base station and the first UE.

The power control configuration transmission receiver 1225 may be configured to provide or support a means for receiving a transmission from the first UE based on the second UE using the power control configuration to adjust the one or more power control parameters.

Figure 13:
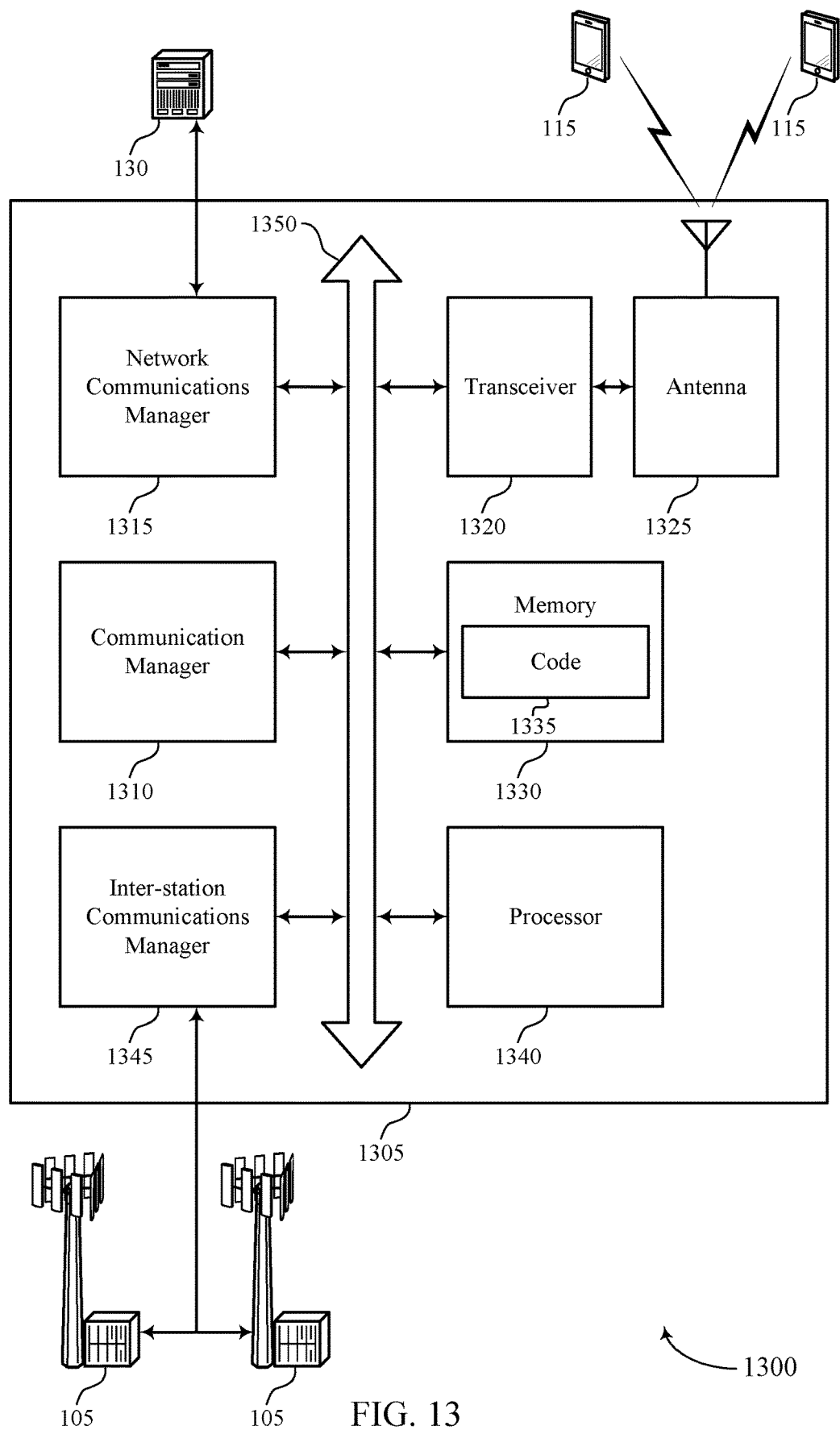
FIG. 13 shows a diagram of a system including a device that supports sidelink coordination for power control in accordance with one or more aspects of the present disclosure.

FIG. 13 shows a diagram of a system 1300 including a device 1305 that supports sidelink coordination for power control in accordance with one or more aspects of the present disclosure. The device 1305 may be an example of or include the components of device 1005, device 1105, or a network device 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may be configured to provide or support a means for receiving a message from a first UE identifying a group of UEs; a means for determining at least a second UE of the group of UEs is out of coverage of the base station based on the message; and a means for transmitting, to a first UE, a command for transmitting, from the first UE and to a second UE, an indication of a power control configuration corresponding to communication between the first UE and the base station, where the first UE is within a coverage area of the base station, and where the second UE uses the power control configuration to adjust one or more power control parameters.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting sidelink coordination for power control).

The inter-station communications manager 1345 may manage communications with other network device 105, and may include a controller or scheduler for controlling communications with UEs 115 in cooperation with other network devices 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between network devices 105.

Figure 14:
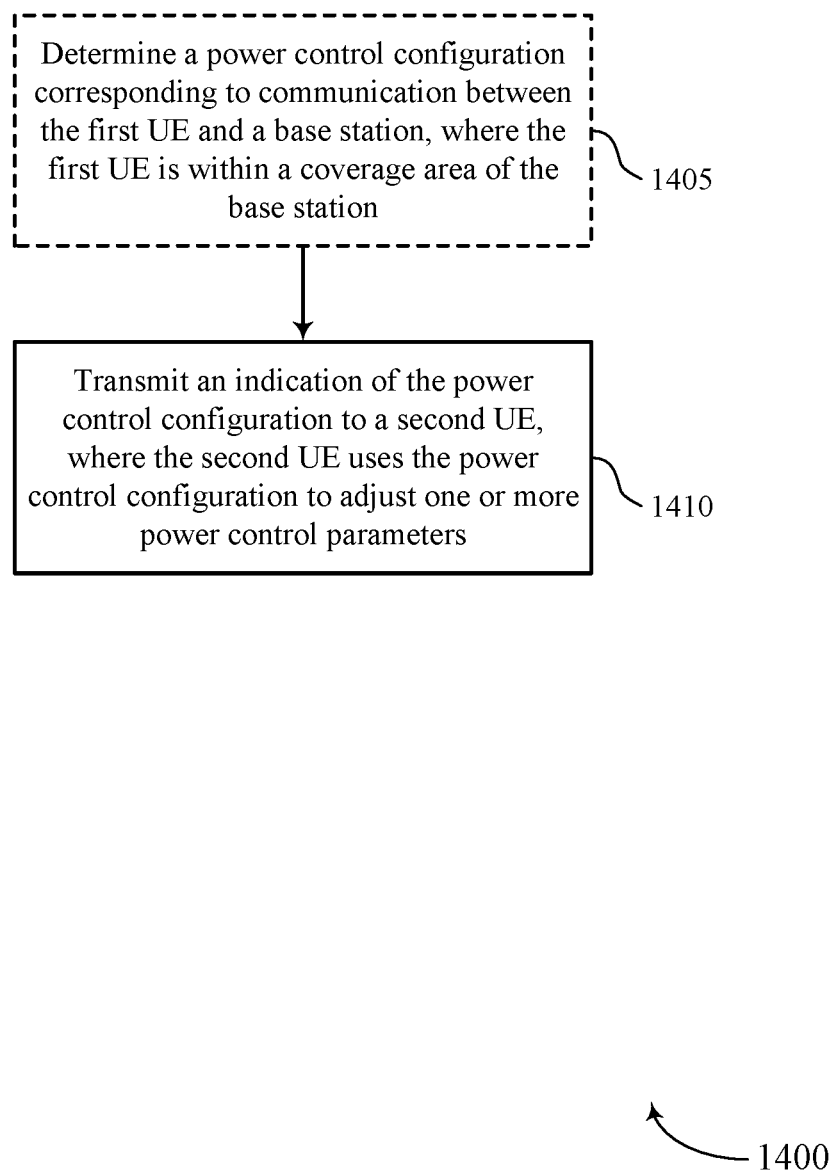
FIGS. 14 through 20 show flowcharts illustrating methods that support sidelink coordination for power control in accordance with one or more aspects of the present disclosure.

FIG. 14 shows a flowchart illustrating a method 1400 that supports sidelink coordination for power control in accordance with one or more aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may determine a power control configuration corresponding to communication between the first UE and a base station, where the first UE is within a coverage area of the base station. The operations of 1405 may be performed according to the methods described herein. In some examples, aspects of the operations of 1405 may be performed by a power control configuration determination component as described with reference to FIGS. 6 through 9.

At 1410, the UE may transmit an indication of the power control configuration to a second UE, where the second UE uses the power control configuration to adjust one or more power control parameters. The operations of 1410 may be performed according to the methods described herein. In some examples, aspects of the operations of 1410 may be performed by a power control configuration transmitter as described with reference to FIGS. 6 through 9.

Figure 15:
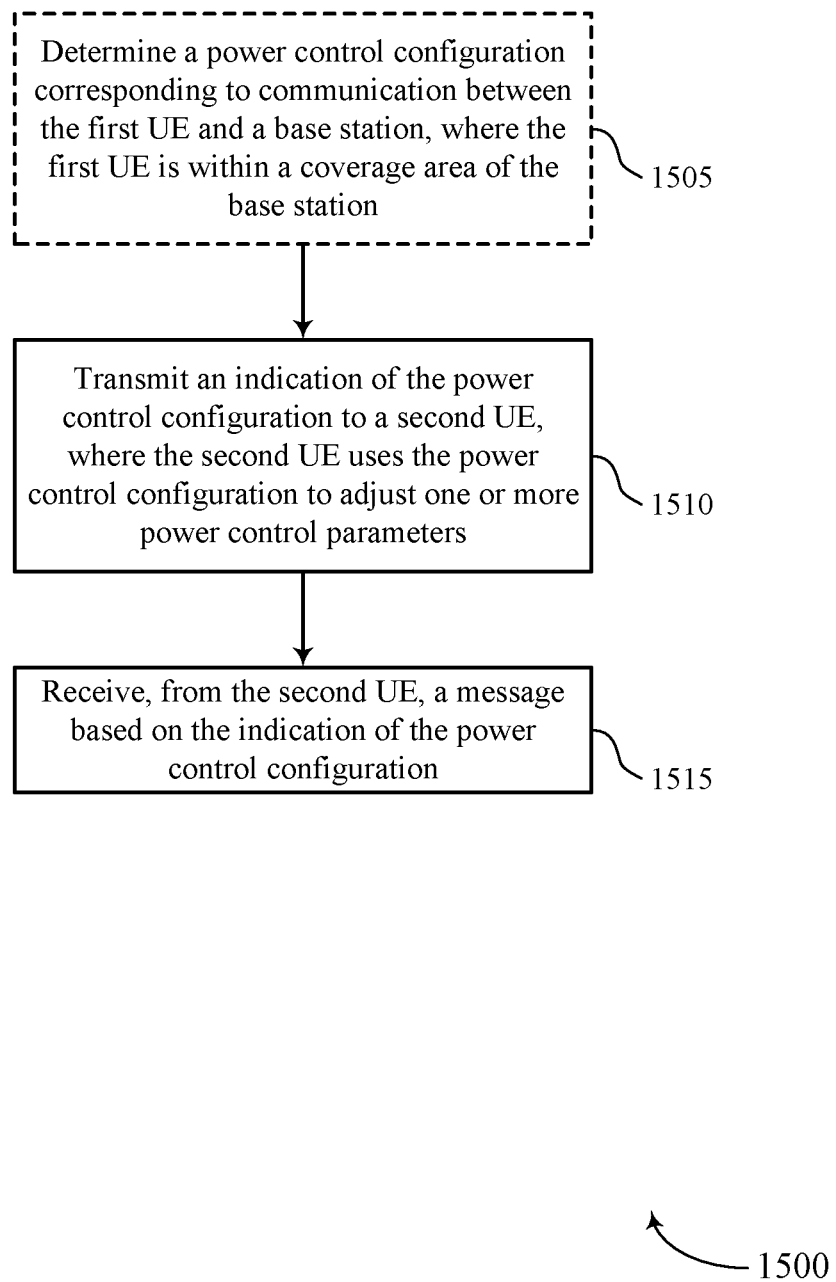

FIG. 15 shows a flowchart illustrating a method 1500 that supports sidelink coordination for power control in accordance with one or more aspects of the present disclosure.

The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may determine a power control configuration corresponding to communication between the first UE and a base station, where the first UE is within a coverage area of the base station. The operations of 1505 may be performed according to the methods described herein. In some examples, aspects of the operations of 1505 may be performed by a power control configuration determination component as described with reference to FIGS. 6 through 9.

At 1510, the UE may transmit an indication of the power control configuration to a second UE, where the second UE uses the power control configuration to adjust one or more power control parameters. The operations of 1510 may be performed according to the methods described herein. In some examples, aspects of the operations of 1510 may be performed by a power control configuration transmitter as described with reference to FIGS. 6 through 9.

At 1515, the UE may receive, from the second UE, a message based on the indication of the power control configuration. The operations of 1515 may be performed according to the methods described herein. In some examples, aspects of the operations of 1515 may be performed by an UE message receiver as described with reference to FIGS. 6 through 9.

Figure 16:
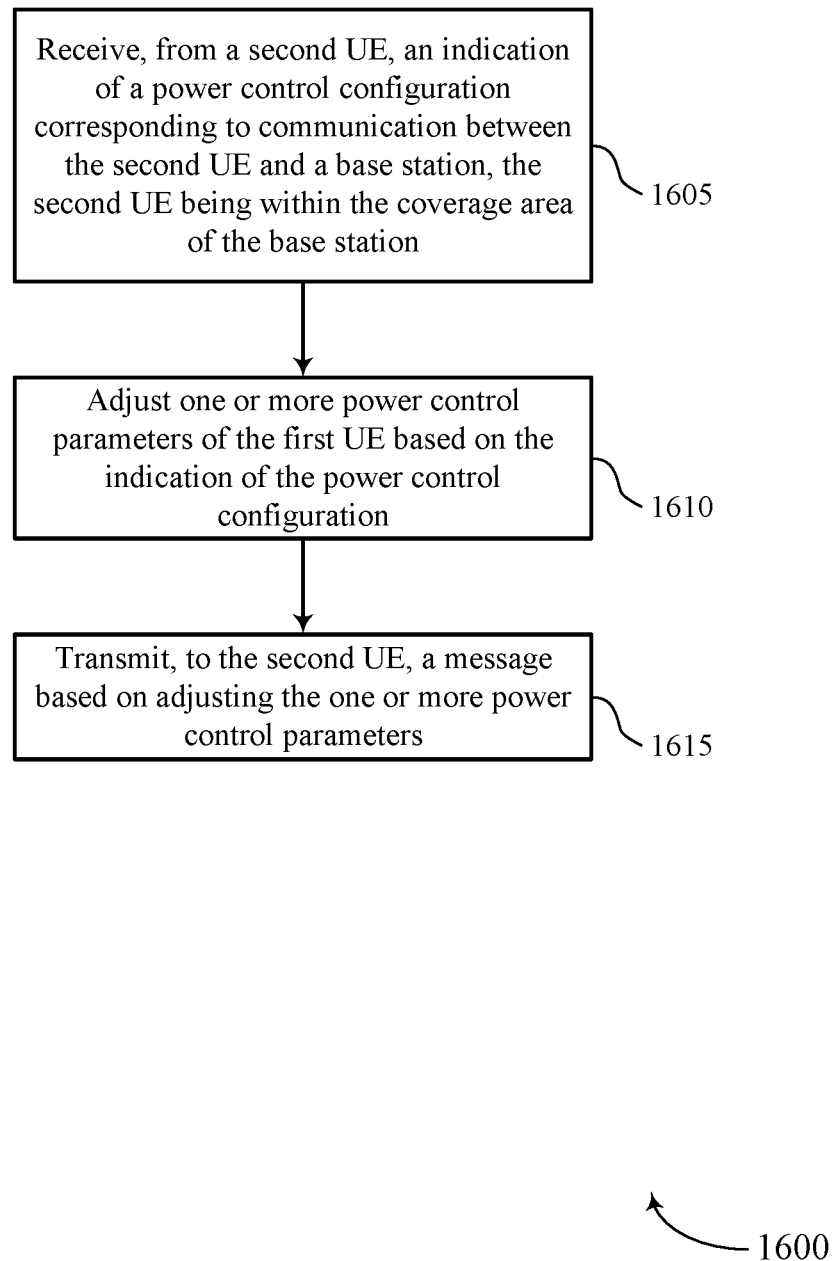

FIG. 16 shows a flowchart illustrating a method 1600 that supports sidelink coordination for power control in accordance with one or more aspects of the present disclosure. The operations of method 1600 may be implemented by a UE 115 or its components as described herein. For example, the operations of method 1600 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1605, the UE may receive, from a second UE, an indication of a power control configuration corresponding to communication between the second UE and a base station, the second UE being within the coverage area of the base station. The operations of 1605 may be performed according to the methods described herein. In some examples, aspects of the operations of 1605 may be performed by a power control configuration receiver as described with reference to FIGS. 6 through 9.

At 1610, the UE may adjust one or more power control parameters of the first UE based on the indication of the power control configuration. The operations of 1610 may be performed according to the methods described herein. In some examples, aspects of the operations of 1610 may be performed by a power control parameter adjustment component as described with reference to FIGS. 6 through 9.

At 1615, the UE may transmit, to the second UE, a message based on adjusting the one or more power control parameters. The operations of 1615 may be performed according to the methods described herein. In some examples, aspects of the operations of 1615 may be performed by an UE message transmitter as described with reference to FIGS. 6 through 9.

Figure 17:
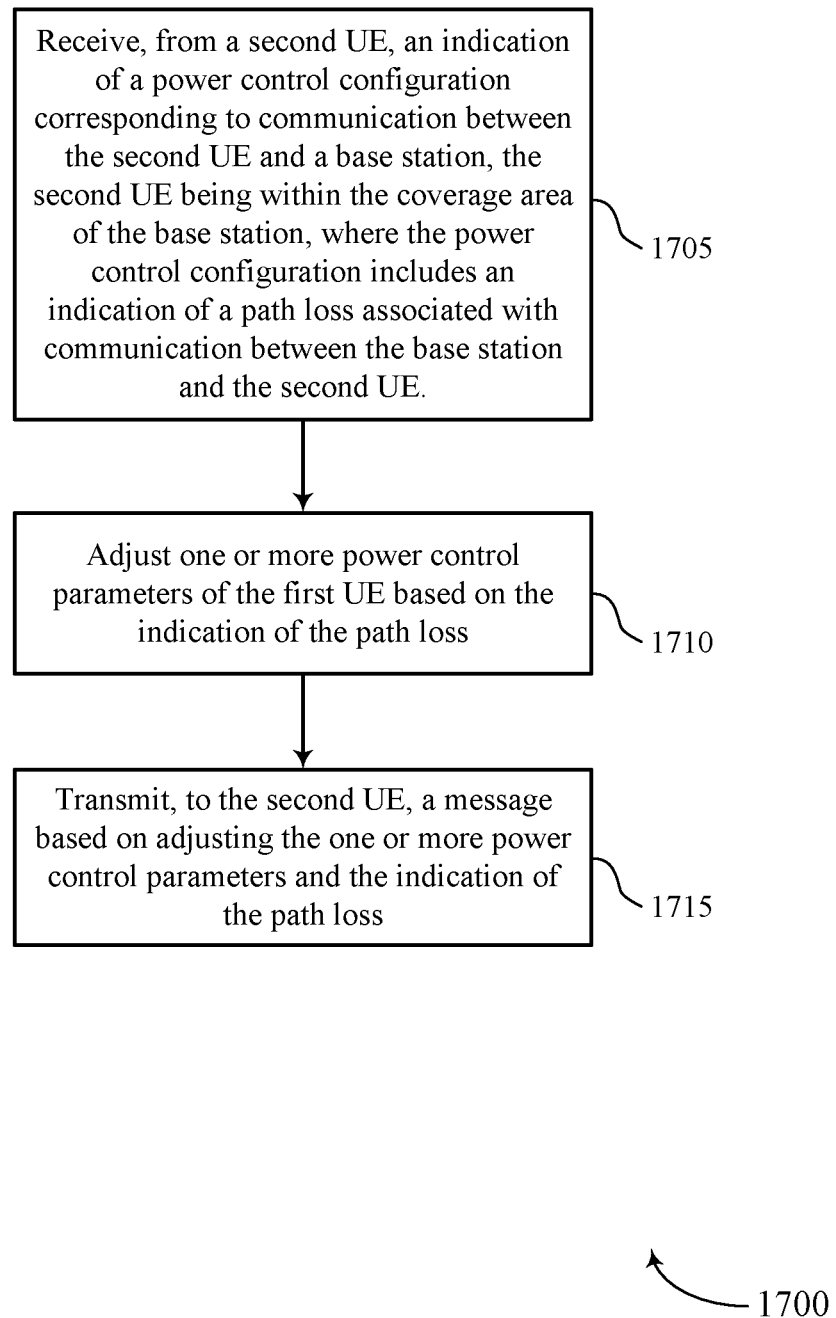

FIG. 17 shows a flowchart illustrating a method 1700 that supports sidelink coordination for power control in accordance with one or more aspects of the present disclosure. The operations of method 1700 may be implemented by a UE 115 or its components as described herein. For example, the operations of method 1700 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1705, the UE may receive, from a second UE, an indication of a power control configuration corresponding to communication between the second UE and a base station, the second UE being within the coverage area of the base station, where the power control configuration includes an indication of a path loss associated with communication between the base station and the second UE. The operations of 1705 may be performed according to the methods described herein. In some examples, aspects of the operations of 1705 may be performed by a power control configuration receiver as described with reference to FIGS. 6 through 9.

At 1710, the UE may adjust one or more power control parameters of the first UE based on the indication of the downlink path loss The operations of 1710 may be performed according to the methods described herein. In some examples, aspects of the operations of 1710 may be performed by a power control parameter adjustment component as described with reference to FIGS. 6 through 9.

At 1715, the UE may transmit, to the second UE, a message based on adjusting the one or more power control parameters and the indication of the path loss. The operations of 1715 may be performed according to the methods described herein. In some examples, aspects of the operations of 1715 may be performed by an UE message transmitter as described with reference to FIGS. 6 through 9.

Figure 18:
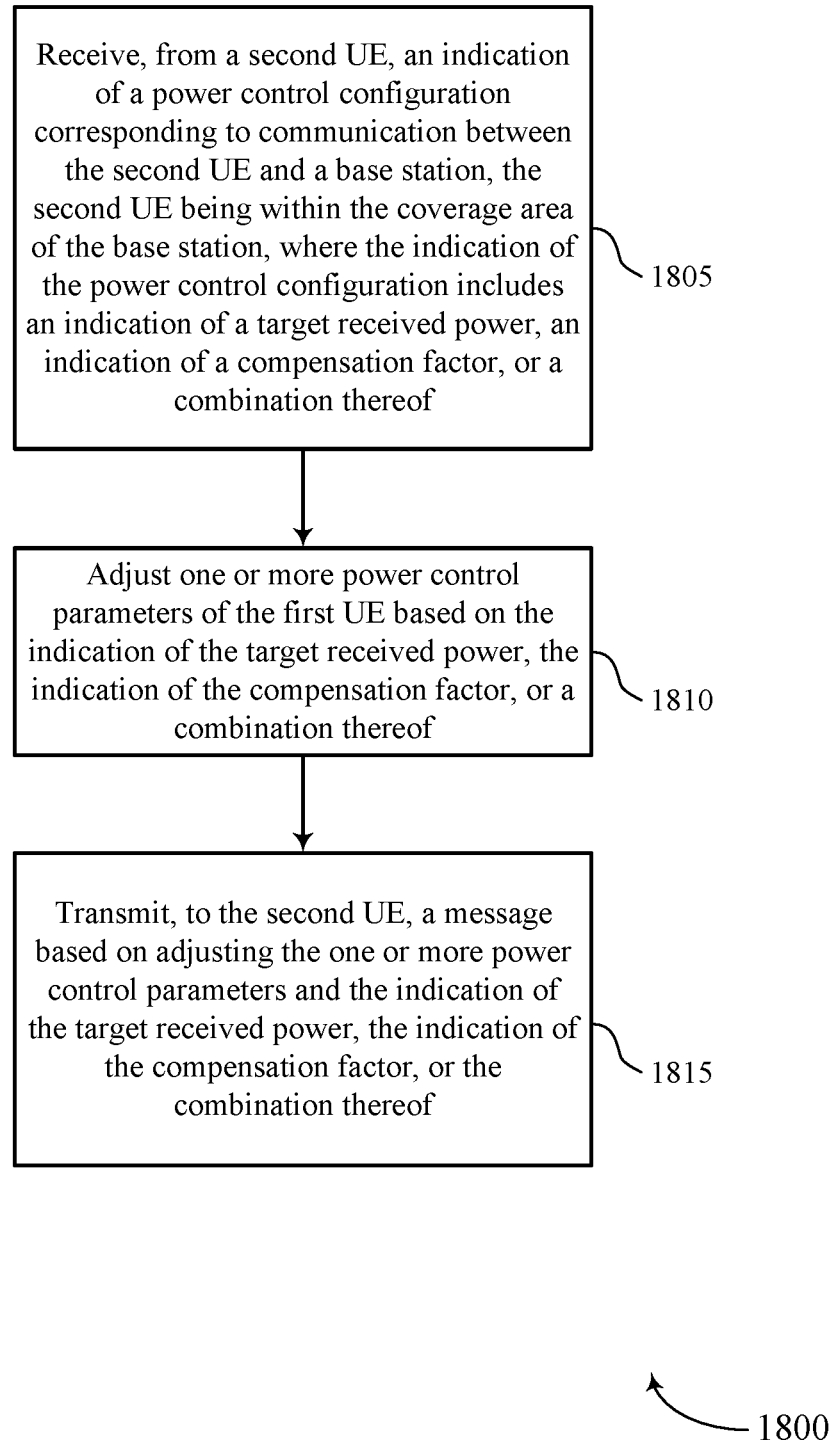

FIG. 18 shows a flowchart illustrating a method 1800 that supports sidelink coordination for power control in accordance with one or more aspects of the present disclosure. The operations of method 1800 may be implemented by a UE 115 or its components as described herein. For example, the operations of method 1800 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1805, the UE may receive, from a second UE, an indication of a power control configuration corresponding to communication between the second UE and a base station, the second UE being within the coverage area of the base station, where the indication of the power control configuration includes an indication of a target received power, an indication of a compensation factor, or a combination thereof. The operations of 1805 may be performed according to the methods described herein. In some examples, aspects of the operations of 1805 may be performed by a power control configuration receiver as described with reference to FIGS. 6 through 9.

At 1810, the UE may adjust one or more power control parameters of the first UE based on the indication of the target received power, the indication of the compensation factor, or a combination thereof. The operations of 1810 may be performed according to the methods described herein. In some examples, aspects of the operations of 1810 may be performed by a power control parameter adjustment component as described with reference to FIGS. 6 through 9.

At 1815, the UE may transmit, to the second UE, a message based on adjusting the one or more power control parameters and the indication of the target received power, the indication of the compensation factor, or the combination thereof. The operations of 1815 may be performed according to the methods described herein. In some examples, aspects of the operations of 1815 may be performed by an UE message transmitter as described with reference to FIGS. 6 through 9.

Figure 19:
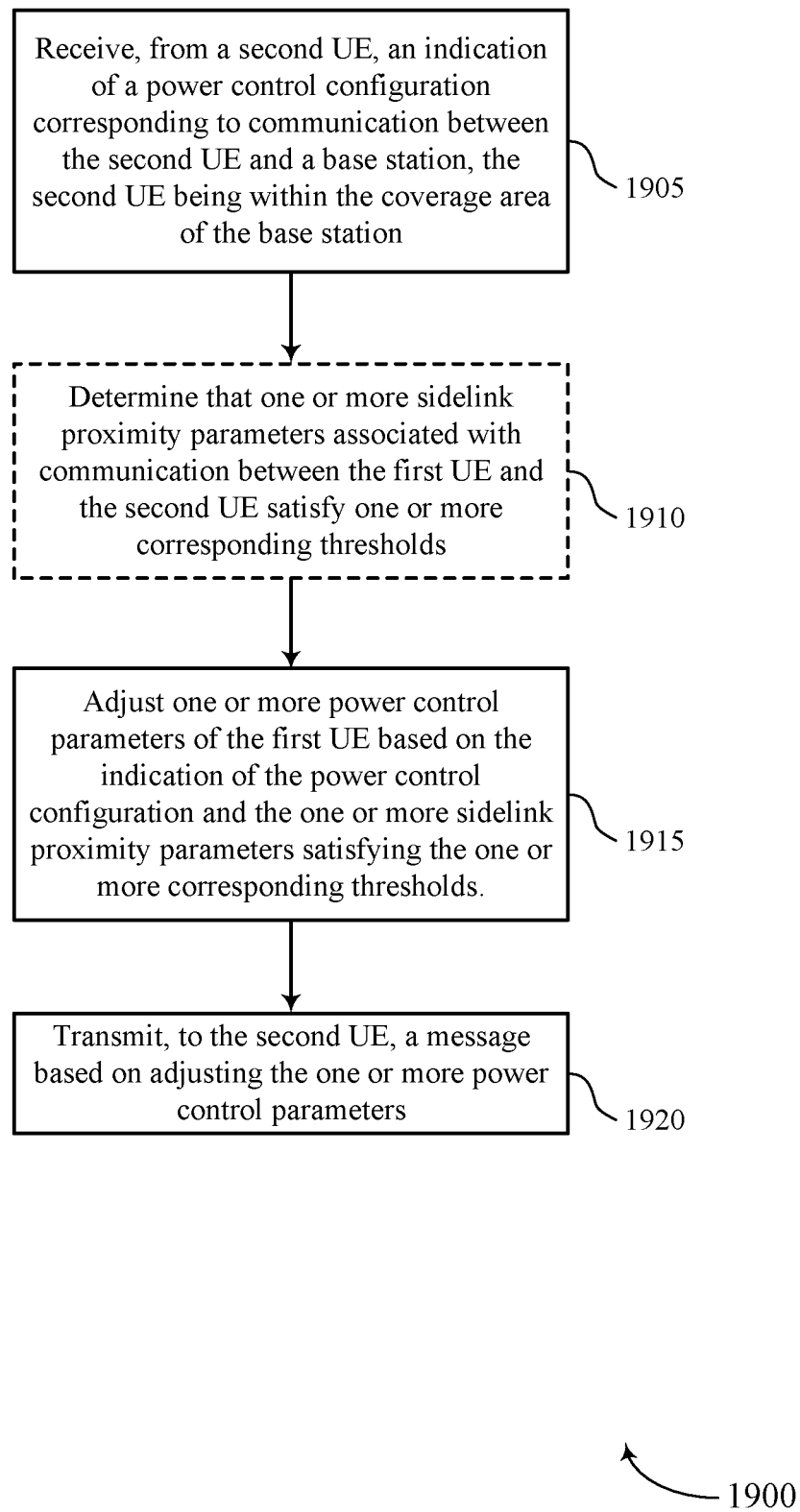

FIG. 19 shows a flowchart illustrating a method 1900 that supports sidelink coordination for power control in accordance with one or more aspects of the present disclosure. The operations of method 1900 may be implemented by a UE 115 or its components as described herein. For example, the operations of method 1900 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1905, the UE may receive, from a second UE, an indication of a power control configuration corresponding to communication between the second UE and a base station, the second UE being within the coverage area of the base station. The operations of 1905 may be performed according to the methods described herein. In some examples, aspects of the operations of 1905 may be performed by a power control configuration receiver as described with reference to FIGS. 6 through 9.

At 1910, the UE may determine that one or more sidelink proximity parameters associated with communication between the first UE and the second UE satisfy one or more corresponding thresholds. The operations of 1910 may be performed according to the methods described herein. In some examples, aspects of the operations of 1910 may be performed by a proximity parameter component as described with reference to FIGS. 6 through 9.

At 1915, the UE may adjust one or more power control parameters of the first UE based on the indication of the power control configuration and the one or more sidelink proximity parameters satisfying the one or more corresponding thresholds. The operations of 1915 may be performed according to the methods described herein. In some examples, aspects of the operations of 1915 may be performed by a power control parameter adjustment component as described with reference to FIGS. 6 through 9.

At 1920, the UE may transmit, to the second UE, a message based on adjusting the one or more power control parameters. The operations of 1920 may be performed according to the methods described herein. In some examples, aspects of the operations of 1920 may be performed by an UE message transmitter as described with reference to FIGS. 6 through 9.

Figure 20:
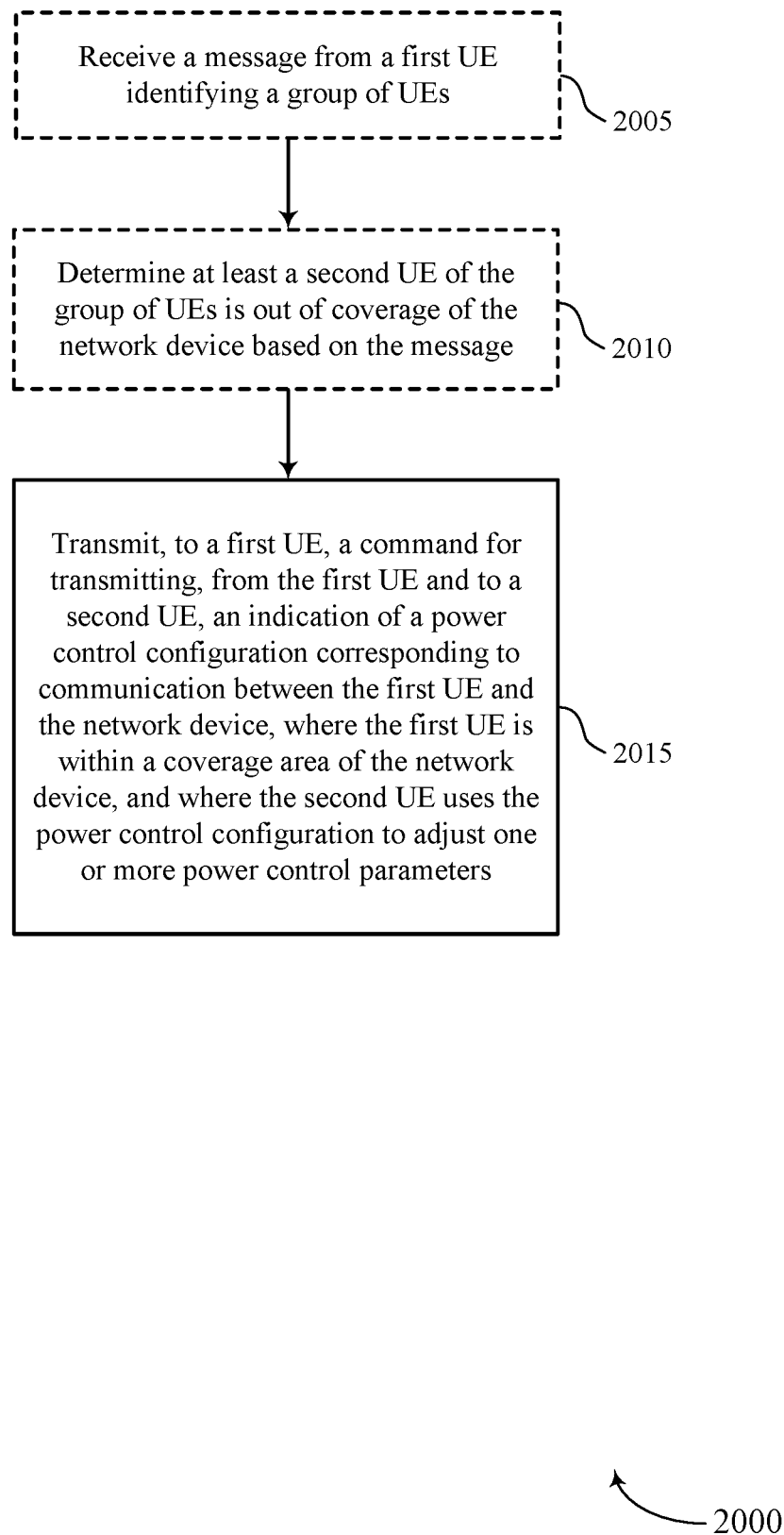

FIG. 20 shows a flowchart illustrating a method 2000 that supports sidelink coordination for power control in accordance with one or more aspects of the present disclosure. The operations of method 2000 may be implemented by a network device 105 or its components as described herein. For example, the operations of method 2000 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 2005, the network device may receive a message from a first UE identifying a group of UEs. The operations of 2005 may be performed according to the methods described herein. In some examples, aspects of the operations of 2005 may be performed by a message receiver as described with reference to FIGS. 10 through 13.

At 2010, the network device may determine at least a second UE of the group of UEs is out of coverage of the network device based on the message. The operations of 2010 may be performed according to the methods described herein. In some examples, aspects of the operations of 2010 may be performed by an OOC determination component 2010 as described with reference to FIGS. 10 through 13.

At 2015, the base station may transmit, to the first UE, a command for transmitting, from the first UE and to the second UE, an indication of a power control configuration corresponding to communication between the first UE and the network device, where the first UE is within a coverage area of the network device, and where the second UE uses the power control configuration to adjust one or more power control parameters. The operations of 2015 may be performed according to the methods described herein. In some examples, aspects of the operations of 2015 may be performed by a power control configuration command transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a first UE, comprising: determining a power control configuration corresponding to communication between the first UE and a base station, wherein the first UE is within a coverage area of the base station; and transmitting an indication of the power control configuration to a second UE, wherein the second UE uses the power control configuration to adjust one or more power control parameters.

Example 2: The method of example 1, further comprising: receiving, from the second UE, a message based at least in part on the indication of the power control configuration.

Example 3: The method of any of examples 1 or 2, further comprising: determining a path loss associated with the communication between the first UE and the base station, wherein the power control configuration comprises an indication of the path loss.

Example 4: The method of any of examples 1 through 3, wherein the power control configuration comprises an indication of a target received power, an indication of a compensation factor, or a combination thereof.

Example 5: The method of any of examples 1 through 4, further comprising: receiving, from the second UE, a request for the indication of the power control configuration; and transmitting, to the second UE, the indication of the power control configuration based at least in part on the request.

Example 6: The method of any of examples 1 through 5, further comprising: receiving, from the base station, a command for transmitting the indication of the power control configuration; and transmitting, to the second UE, the indication of the power control configuration based at least in part on the command.

Example 7: The method of any of examples 1 through 6, further comprising: transmitting the power control configuration to a third UE.

Example 8: The method of any of examples 1 through 7, wherein the second UE is outside of the coverage area of the base station.

Example 9: The method of any of examples 1 through 8, further comprising: determining a group of UEs comprising the second UE and transmitting, to the base station, a message from the first UE determining the group of UEs and indicating that the second UE is outside of the coverage area of the base station.

Example 10: An apparatus for wireless communication comprising at least one means for performing a method of any one of examples 1 through 9.

Example 11: An apparatus for wireless communication comprising a processor and memory coupled to the processor, the processor and memory configured to perform a method of any one of examples 1 through 9.

Example 12: A non-transitory computer-readable medium storing code for wireless communication, the code comprising instructions executable by a processor to perform a method of any one of examples 1 through 9.

Example 13: A method for wireless communication at a first UE, comprising: receiving, from a second UE, an indication of a power control configuration corresponding to communication between the second UE and a base station, the second UE being within a coverage area of the base station; adjusting one or more power control parameters of the first UE based at least in part on the indication of the power control configuration; and transmitting, to the second UE, a message based at least in part on adjusting the one or more power control parameters.

Example 14: The method of example 13, wherein the indication of the power control configuration comprises an indication of a path loss associated with the communication between the base station and the second UE, and further comprising: adjusting the one or more power control parameters of the first UE based at least in part on the indication of the path loss; and transmitting the message to the second UE based at least in part on the indication of the path loss.

Example 15: The method of any of examples 13 or 14, wherein the indication of the power control configuration comprises an indication of a target received power, an indication of a compensation factor, or a combination thereof, and further comprising: adjusting the one or more power control parameters of the first UE based at least in part on the indication of the target received power, the indication of the compensation factor, or the combination thereof; and transmitting the message to the second UE based at least in part on the indication of the target received power, the indication of the compensation factor, or the combination thereof.

Example 16: The method of any of examples 13 through 15, further comprising: determining that one or more sidelink proximity parameters associated with communication between the first UE and the second UE satisfy one or more corresponding thresholds; and adjusting the one or more power control parameters based at least in part on the one or more sidelink proximity parameters satisfying the one or more corresponding thresholds.

Example 17: The method of any of examples 13 through 16, wherein the one or more sidelink proximity parameters comprise a path loss associated with the communication between the first UE and the second UE, and further comprising: determining that the path loss is below a threshold path loss; and adjusting the one or more power control parameters based at least in part on the path loss being below the threshold path loss.

Example 18: The method of any of examples 13 through 17, wherein the one or more sidelink proximity parameters comprise a distance between the first UE and the second UE, and further comprising: determining that the distance is below a threshold distance; and adjusting the one or more power control parameters based at least in part on the distance being below the threshold distance.

Example 19: The method of any of examples 13 through 18, wherein the one or more sidelink proximity parameters comprise a RSRP associated with the communication between the first UE and the second UE, and further comprising: determining that the RSRP is above an RSRP threshold; and adjusting the one or more power control parameters based at least in part on the RSRP being above the RSRP threshold.

Example 20: The method of any of examples 13 through 19, further comprising: transmitting, to the second UE, a request for the indication of the power control configuration; and receiving the indication of the power control configuration based at least in part on transmitting the request.

Example 21: The method of any of examples 13 through 20, further comprising: determining a transmit power based at least in part on the adjusted one or more power control parameters; and transmitting the message to the second UE based at least in part on the determined transmit power.

Example 22: The method of any of examples 13 through 21, further comprising: determining a path loss associated with communication between the first UE and the second UE; and determining the transmit power based at least in part on the path loss.

Example 23: The method of any of examples 13 through 22, wherein the indication of the power control configuration comprises an indication of a target received power, an indication of a compensation factor, or a combination thereof, wherein the transmit power is linearly proportional to the indicated target received power, exponentially proportional to the indicated compensation factor, or a combination thereof.

Example 24: The method of any of examples 13 through 23, wherein the first UE is outside of the coverage area of the base station.

Example 25: An apparatus for wireless communication comprising at least one means for performing a method of any one of examples 13 through 24.

Example 26: An apparatus for wireless communication comprising a processor and memory coupled to the processor, the processor and memory configured to perform a method of any one of examples 13 through 24.

Example 27: A non-transitory computer-readable medium storing code for wireless communication, the code comprising instructions executable by a processor to perform a method of any one of examples 13 through 24.

Example 28: A method for wireless communication at a base station, comprising: receiving a message from a first UE identifying a group of UEs; determining at least a second UE of the group of UEs is out of coverage of the base station based at least in part on the message; transmitting, to the first UE, a command for transmitting, from the first UE and to the second UE, an indication of a power control configuration corresponding to communication between the first UE and the base station, wherein the first UE is within a coverage area of the base station, and wherein the second UE uses the power control configuration to adjust one or more power control parameters.

Example 29: The method of example 28, further comprising: receiving a transmission from the first UE based at least in part on the second UE using the power control configuration to adjust the one or more power control parameters.

Example 30: The method of any of examples 28 or 29, wherein the power control configuration comprises an indication of a target received power, an indication of a compensation factor, or a combination thereof, and wherein the transmission is received based at least in part on the power control configuration comprising the indication of the target received power, the indication of the compensation factor, or the combination thereof.

Example 31: The method of any of examples 28 through 30, wherein the power control configuration comprises an indication of a path loss corresponding to communication between the base station and the first UE.

Example 32: The method of any of examples 28 through 31, wherein the second UE is outside of the coverage area of the base station.

Example 33: An apparatus for wireless communication comprising at least one means for performing a method of any one of examples 28 through 32.

Example 34: An apparatus for wireless communication comprising a processor and memory coupled to the processor, the processor and memory configured to perform a method of any one of examples 28 through 32.

Example 35: A non-transitory computer-readable medium storing code for wireless communication, the code comprising instructions executable by a processor to perform a method of any one of examples 28 through 32.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    determining a target receive power corresponding to communication between the first UE and a network entity, wherein the first UE is within a coverage area of the network entity;
    transmitting an indication of the target receive power to a second UE, wherein the second UE uses the target receive power to adjust a first power control parameter; and
    receiving, from the second UE, a message based at least in part on a combination of the target receive power with a second power control parameter.

2. The method of claim 1, further comprising:
    transmitting, to the second UE, an indication of a path loss associated with the communication between the first UE and the network entity.

3. The method of claim 1, further comprising:
    transmitting, to the second UE, an indication of a compensation factor, wherein the second power control parameter is associated with the compensation factor.

4. The method of claim 1, further comprising:
    receiving, from the second UE, a request for the indication of the target receive power; and
    transmitting, to the second UE, the indication of the target receive power based at least in part on the request.

5. The method of claim 1, further comprising:
    receiving, from the network entity, a command indicating to transmit the indication of the target receive power; and
    transmitting, to the second UE, the indication of the target receive power based at least in part on the command.

6. The method of claim 1, further comprising:
    transmitting the target receive power to a third UE.

7. The method of claim 1, wherein the second UE is outside of the coverage area of the network entity.

8. The method of claim 7, further comprising:
    determining a group of UEs comprising the second UE; and
    transmitting, to the network entity, a message from the first UE indicating the group of UEs and indicating that the second UE is outside of the coverage area of the network entity.

9. An apparatus for wireless communication at a first user equipment (UE), comprising: a processor; and memory coupled to the processor, the processor configured to:
    determine a target receive power corresponding to communication between the first UE and a network entity, wherein the first UE is within a coverage area of the network entity;
    transmit an indication of the target receive power to a second UE, wherein the second UE uses the target receive power to adjust a first power control parameter; and receive, from the second UE, a message based at least in part on a combination of the target receive power with a second power control parameter.

10. The apparatus of claim 9, wherein the apparatus further comprises:
one or more antennas configured to transmit, to the second UE, an indication of a path loss associated with the communication between the first UE and the network entity.

11. The apparatus of claim 9, wherein the processor is further configured to:
transmit, to the second UE, an indication of a compensation factor.

12. The apparatus of claim 9, wherein the processor is further configured to:
receive from the second UE, a request for the indication of the target receive power; and
transmit, to the second UE, the indication of the target receive power based at least in part on the request.

13. The apparatus of claim 9, wherein the processor is further configured to:
receive, from the network entity, a command indicating to transmit the indication of the target receive power; and
transmit, to the second UE, the indication of the target receive power based at least in part on the command.

14. The apparatus of claim 9, wherein the processor is further configured to:
transmit the target receive power to a third UE.

15. The apparatus of claim 9, wherein the second UE is outside of the coverage area of the network entity.

16. The apparatus of claim 15, wherein the processor is further configured to:
determine a group of UEs comprising the second UE; and
transmit, to the network entity, a message from the first UE indicating the group of UEs and indicating that the second UE is outside of the coverage area of the network entity.

17. An apparatus for wireless communication at a first user equipment (UE), comprising:
means for determining a target receive power corresponding to communication between the first UE and a network entity, wherein the first UE is within a coverage area of the network entity;
means for transmitting an indication of the target receive power to a second UE, wherein the second UE uses the target receive power to adjust a first power control parameter; and
means for receiving, from the second UE, a message based at least in part on a combination of the target receive power with a second power control parameter.

18. The apparatus of claim 17, further comprising:
means for transmitting, to the second UE, an indication of a path loss associated with the communication between the first UE and the network entity.

19. The apparatus of claim 17, further comprising:
means for transmitting, to the second UE, an indication of a compensation factor, wherein the second power control parameter is associated with the compensation factor.

20. The apparatus of claim 17, further comprising:
means for receiving, from the second UE, a request for the indication of the target receive power; and
means for transmitting, to the second UE, the indication of the target receive power based at least in part on the request.

21. The apparatus of claim 17, further comprising:
means for receiving, from the network entity, a command indicating to transmit the indication of the target receive power; and
means for transmitting, to the second UE, the indication of the target receive power based at least in part on the command.

22. The apparatus of claim 17, further comprising:
means for transmitting the target receive power to a third UE.

23. The apparatus of claim 17, wherein the second UE is outside of the coverage area of the network entity.

24. The apparatus of 23, further comprising:
means for determining a group of UEs comprising the second UE; and
means for transmitting, to the network entity, a message from the first UE indicating the group of UEs and indicating that the second UE is outside of the coverage area of the network entity.

25. A non-transitory computer-readable medium storing code for wireless communication at a first user equipment (UE), the code comprising instructions executable by a processor to:
determine a target receive power corresponding to communication between the first UE and a network entity, wherein the first UE is within a coverage area of the network entity;
transmit an indication of the target receive power to a second UE, wherein the second UE uses the target receive power to adjust a first power control parameter; and
receive, from the second UE, a message based at least in part on a combination of the target receive power with a second power control parameter.

26. The non-transitory computer-readable medium of claim 25, wherein the instructions are further executable by the processor to:
transmit, to the second UE, an indication of a path loss associated with the communication between the first UE and the network entity.

27. The non-transitory computer-readable medium of claim 25, wherein the instructions are further executable by the processor to:
transmit, to the second UE, an indication of a compensation factor.

28. The non-transitory computer-readable medium of claim 25, wherein the instructions are further executable by the processor to:
receive from the second UE, a request for the indication of the target receive power; and
transmit, to the second UE, the indication of the target receive power based at least in part on the request.

29. The non-transitory computer-readable medium of claim 25, wherein the instructions are further executable by the processor to:
receive, from the network entity, a command indicating to transmit the indication of the target receive power; and
transmit, to the second UE, the indication of the target receive power based at least in part on the command.

30. The non-transitory computer-readable medium of claim 25, wherein the instructions are further executable by the processor to:
transmit the target receive power to a third UE.

* * * * *